United States Patent
Nishimura et al.

(10) Patent No.: US 11,844,063 B2
(45) Date of Patent: Dec. 12, 2023

(54) PACKET PROCESSING APPARATUS AND PACKET PROCESSING METHOD

(71) Applicant: FUJITSU LIMITED, Kawasaki (JP)

(72) Inventors: Kazuto Nishimura, Yokohama (JP); Nobuhiro Rikitake, Machida (JP)

(73) Assignee: FUJITSU LIMITED, Kawasaki (JP)

(*) Notice: Subject to any disclaimer, the term of this patent is extended or adjusted under 35 U.S.C. 154(b) by 198 days.

(21) Appl. No.: 17/108,334

(22) Filed: Dec. 1, 2020

(65) Prior Publication Data
US 2021/0195615 A1 Jun. 24, 2021

(30) Foreign Application Priority Data
Dec. 20, 2019 (JP) .................. 2019-230637

(51) Int. Cl.
*H04W 72/12* (2023.01)
*H04W 72/1263* (2023.01)
*H04L 5/14* (2006.01)

(52) U.S. Cl.
CPC ........... *H04W 72/1263* (2013.01); *H04L 5/14* (2013.01)

(58) Field of Classification Search
CPC ........... H04L 5/14; H04Q 2213/13098; H04W 72/1263
See application file for complete search history.

(56) References Cited

U.S. PATENT DOCUMENTS

| | | | |
|---|---|---|---|
| 2003/0202525 A1 | 10/2003 | Nagatomo | |
| 2019/0215832 A1 | 7/2019 | Nishimura | |
| 2022/0116825 A1* | 4/2022 | Shibata | H04W 28/0967 |

FOREIGN PATENT DOCUMENTS

| | | | |
|---|---|---|---|
| JP | 2003-318964 A | 11/2003 | |
| JP | 2018-125597 | 8/2018 | |
| JP | 2018-129661 A | 8/2018 | |
| JP | 2019-050449 | 3/2019 | |
| JP | 2019-110404 | 7/2019 | |
| WO | WO-2014209959 A1 * | 12/2014 | H04L 1/1861 |

OTHER PUBLICATIONS

JPOA—Office Action of Japanese Patent Application No. 2019-230637 dated Jul. 11, 2023 with Full Machine Translation.

* cited by examiner

*Primary Examiner* — Khaled M Kassim
*Assistant Examiner* — Zhaohui Yang
(74) *Attorney, Agent, or Firm* — Fujitsu Patent Center

(57) ABSTRACT

A packet processing apparatus includes a memory, a processor, a first gate, and a second gate. The memory stores a plurality of allocation patterns for allocating an upstream or downstream of a link direction for each subframe within a predetermined period. The processor obtains a periodicity pattern of a high-priority packet for each of time slots within the subframe. The first gate opens and closes, for each of the time slots within the subframe, output of the high-priority packet. The second gate opens and closes, for each of the time slots within the subframe, output of a low-priority packet. The processor sets gate states of the first gate and the second gate for a predetermined time slot within the subframe in the same link direction as the periodicity pattern to a priority state in which the high-priority packet is preferentially output according to the periodicity pattern.

7 Claims, 20 Drawing Sheets

| | | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| INDEX VALUE | 0 | D | S | U | U | U | D | S | U | U | U |
| | 1 | D | S | U | U | D | D | S | U | U | D |
| | 2 | D | S | U | D | D | D | S | U | D | D |
| | 3 | D | S | U | U | U | D | D | D | D | D |
| | 4 | D | S | U | U | D | D | D | D | D | D |
| | 5 | D | S | U | D | D | D | D | D | D | D |
| | 6 | D | S | U | U | U | D | S | U | U | D |

FIG. 5

| TS NUMBER | FIRST GATE | SECOND GATE | RETENTION TIME |
|---|---|---|---|
| 1 | O | C | 10 μs |
| 2 | O | C | 20 μs |
| 3 | O | C | 10 μs |
| 4 | O | O | 5 μs |
| 5 | O | O | 5 μs |
| 6 | O | O | 15 μs |
| ... | ... | ... | ... |
| X | O | O | 15 μs |

FIG. 15

|  |  | SUBFRAME NUMBER | | | | | | | | | |
|---|---|---|---|---|---|---|---|---|---|---|---|
|  |  | 0 | 1 | 2 | 3 | 4 | 5 | 6 | 7 | 8 | 9 |
| TO WHICH DOES IT CHANGE? | 0 | D | S | U | U | U | D | S | U | U | U |
|  | 1 | D | S | U | U | D | D | S | U | U | D |
| INDEX VALUE | 2 | D | S | U | D | D | D | S | U | D | D |
|  | 3 | D | S | U | U | U | D | D | D | D | D |
|  | 4 | D | S | U | U | D | D | D | D | D | D |
|  | 5 | D | S | U | D | D | D | D | D | D | D |
|  | 6 | D | S | U | U | U | D | S | U | U | D |

FIG. 18B

| | | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| INDEX VALUE | 0 | D | S | U | U | U | D | S | U | U | U |
| | 1 | D | S | U | U | D | D | S | U | U | D |
| | 2 | D | S | U | D | D | D | S | U | D | D |
| | 3 | D | S | U | U | U | D | D | D | D | D |
| | 4 | D | S | U | U | D | D | D | D | D | D |
| | 5 | D | S | U | D | D | D | D | D | D | D |
| | 6 | D | S | U | U | U | D | S | U | U | D |

PACKET PROCESSING APPARATUS AND PACKET PROCESSING METHOD

CROSS-REFERENCE TO RELATED APPLICATION

This application is based upon and claims the benefit of priority of the prior Japanese Patent Application No. 2019-230637, filed on Dec. 20, 2019, the entire contents of which are incorporated herein by reference.

FIELD

The embodiments discussed herein are related to a packet processing apparatus and a packet processing method.

BACKGROUND

In the fifth generation mobile communication system (5G), provision of new services such as "ultra-high speed", "ultra-multi connection", and "ultra-low latency", for example, has been expected. Furthermore, as 5G is expected to implement end-to-end services with a wired section and a wireless section being integrated, various requirements are imposed on communication devices in the wired section. Among the services, "ultra-low latency" is an index that has not been available in the past, and demands placed on communication devices in the wired section to be connected to the wireless section also increase.

One of the reasons why the ultra-low latency is needed is, for example, hybrid automatic repeat request (HARQ) control of a wireless layer. The HARQ is a protocol that operates in a media access control (MAC) layer between a smartphone (user equipment (UE)) and a base station, for example, and is expected to return an acknowledgment (ACK) response within 4 ms after data transmission. The HARQ has traditionally been a requirement only for a wireless area. However, with widespread use of centralized radio access network (C-RAN) in which a base station is separated into a baseband function (central unit (CU) and distributed unit (DU)) and an antenna (remote unit (RU)), a new wired section between the RU and the base station is also to be included in the coverage. Accordingly, a latency requirement within 100 us is defined in MFH standards such as Institute of Electrical and Electronics Engineers (IEEE) 802.1CM and IEEE 1914.1.

Meanwhile, with regard to 5G mobile fronthaul Haul (MFH), a common public radio interface (CPRI) is being replaced with eCPRI, and Ethernet packets are considered to be mainstream traffic of the MFH in the future. As a result, it can be shared with other access networks, whereby the MFH is expected to be in a situation where Internet of things (IoT) and wired Internet traffic are mixed. In other words, for example, in the 5G MFH, there has been a demand for improvement of the transmission efficiency of low-priority packets such as the wired Internet while ensuring low latency for high-priority packets of smartphones. In view of the above, IEEE 802.1Qbv (time aware shaper (TAS)), which is a low-latency standard that can satisfy the requirement, has been attracting attention.

The TAS is a technique capable of reducing packet collision latency. The collision latency indicates latency that occurs in a situation where, when two packets arrive at a switch almost at the same time, the later-arriving packet is caused to wait until transmission of the first-arriving packet is complete even if the later-arriving packet is a high-priority packet. The TAS has a gate that outputs a high-priority packet and a gate that outputs a low-priority packet disposed at the exit of a queue. Besides, the TAS is a concept for avoiding a collision between a high-priority packet and a low-priority packet by closing the gate that outputs the low-priority packet at the timing when the high-priority packet arrives.

In view of the above, the present applicant has proposed a packet processing apparatus including a plurality of storage units, an opening/closing unit, a collection unit, an analysis unit, and a control unit. The storage unit stores received packets for each type of the received packets, for example, each of a high-priority packet and a low-priority packet. The opening/closing unit opens/closes output of each storage unit. The collection unit collects a packet flow rate for each time slot of the received packets. The analysis unit specifies a periodicity pattern of the received packets on the basis of the packet flow rate for each time slot of the received packets. The control unit specifies a time slot section in which the high-priority packet is preferentially output on the basis of the specified periodicity pattern of the received packets, and controls opening/closing of each opening/closing unit in the specified time slot section. As a result, it becomes possible to suppress the output latency of the high-priority packet.

Furthermore, 5G is expected to adopt a time division duplex (TDD) scheme in the wireless section. FIG. 18A is an explanatory diagram illustrating an exemplary method of transmitting signals in uplink and downlink subframe units in the wireless section and the wired section. In the wireless section connecting the UE and the RU by wireless communication as illustrated in FIG. 18A, the same frequency is used in the uplink and the downlink, and either uplink or downlink is assigned in subframe (transmission time interval (TTI)) units. Currently, the TDD defines seven allocation patterns with a cycle of TTI×10 (10 ms), and which allocation pattern to use is determined in advance. In the wired section connecting the RU and the base station by wired communication as illustrated in FIG. 18A, since it is full-duplex communication of an upstream line and a downstream line, only the traffic of either the upstream line of the uplink or the downstream line of the downlink flows at an arbitrary time regardless of the usage pattern.

FIG. 18B is an explanatory diagram illustrating an exemplary uplink and downlink allocation pattern for each index value based on the TDD scheme. In 5G, there is a method called dynamic TDD in which the allocation pattern (index values "0" to "6") based on the TDD scheme is dynamically switched. The allocation pattern is a pattern in the link direction (uplink/downlink) to be allocated for each subframe within the TDD cycle. Note that "D" illustrated in FIG. 18B represents a downlink direction, "U" represents an uplink direction, and "S" represents a special link direction. For example, with regard to the allocation pattern of the index value "0", "D" is allocated at the timing of subframe numbers "0" and "5", "S" is allocated at the timing of subframe numbers "1" and "6", and "U" is allocated at the timing of subframe numbers "2" to "4" and "7" to "9". Furthermore, with regard to the allocation pattern of the index value "6", "D" is allocated at the timing of subframe numbers "O", "5", and "9", "S" is allocated at the timing of subframe numbers "1" and "6", and "U" is allocated at the timing of subframe numbers "2" to "4", "7", and "8". Note that "S" is to be allocated to the uplink direction for convenience of explanation. The dynamic TDD is a method of switching the allocation pattern of index values suitable for the optimum link ratio of the uplink/downlink in a case where the link ratio of the uplink/downlink traffic changes.

Japanese Laid-open Patent Publication No. 2018-129661 and Japanese Laid-open Patent Publication No. 2003-318964 are disclosed as related art.

SUMMARY

According to an aspect of the embodiments, a packet processing apparatus that connects, by full-duplex communication using an upstream line and a downstream line, a distributed station and a central station, the packet processing apparatus includes: a memory configured to store a plurality of allocation patterns for allocating an upstream or downstream of a link direction for each subframe within a predetermined period based on a time division duplex scheme; a processor configured to obtain a periodicity pattern of a high-priority packet for each of time slots within the subframe for each of the link directions; a first gate configured to open and close, for each of the time slots within the subframe, output of the high-priority packet to the upstream line or the downstream line; and a second gate configured to open and close, for each of the time slots within the subframe, output of a low-priority packet to the upstream line or the downstream line, wherein the processor is further configured to set gate states of the first gate and the second gate for a predetermined time slot within the subframe in the same link direction as the periodicity pattern to a priority state in which the high-priority packet is preferentially output according to the periodicity pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating an exemplary configuration of a list table;

FIG. 15 is an explanatory diagram illustrating an exemplary allocation pattern table in a case where a plurality of allocation patterns is predicted;

FIG. 18B is an explanatory diagram illustrating an exemplary uplink and downlink allocation pattern for each index value based on the TDD scheme.

DESCRIPTION OF EMBODIMENTS

It is required to suppress the output delay of high priority packets even when the allocation pattern according to the flow rate of received packets in each link direction changes dynamically.

One aspect is to provide a packet processing apparatus and a packet processing method that can suppress the bandwidth pressure of low priority packets.

Hereinafter, embodiments of a packet processing apparatus and a packet processing method disclosed in the present application will be described in detail with reference to the accompanying drawings. Note that the disclosed technology is not limited by each of the embodiments. Furthermore, each embodiment to be described below may also be combined as appropriate, without causing inconsistency.

Figure 19:
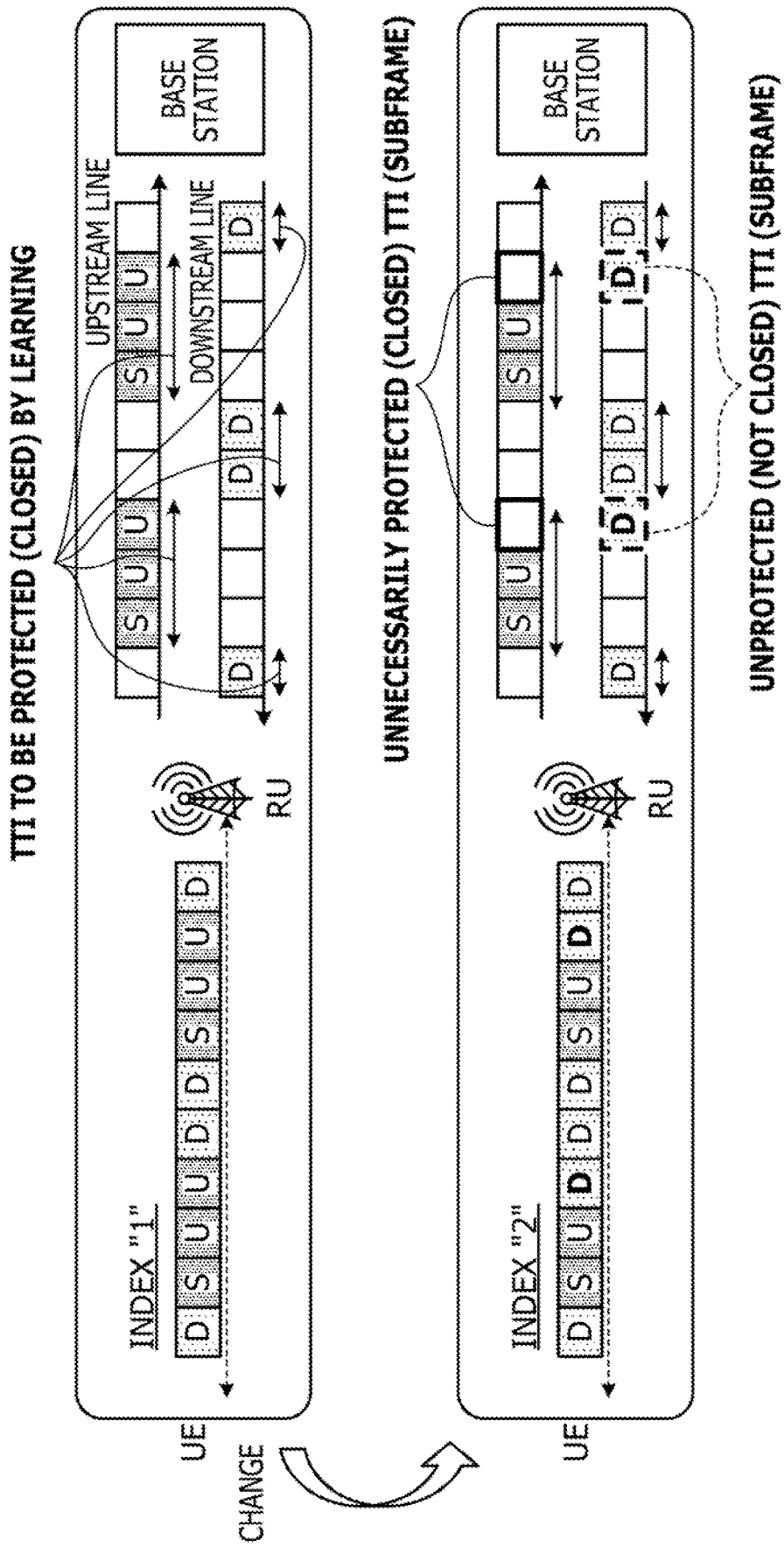
FIG. 19 is an explanatory diagram illustrating an exemplary problem caused by a dynamic change of the index value (allocation pattern).

FIG. 19 is an explanatory diagram illustrating an exemplary problem caused by a dynamic change of an index value (allocation pattern). The packet processing apparatus sets a gate state of a subframe according to a periodicity pattern of a high-priority packet to a priority state in which the high-priority packet is preferentially output. For example, in a case where the packet processing apparatus operates in the allocation pattern of the index value "1", the gate state is set to the priority state at the timing of upstream line subframe numbers "1" to "3" and "6" to "8". Moreover, the packet processing apparatus sets the gate state to a normal state in which the high-priority packet or the low-priority packet is selectively output at the timing of upstream line subframe numbers "0"; "4", "5", and "9".

Furthermore, the packet processing apparatus sets the gate state to the priority state at the timing of downstream line subframe numbers "0", "4", "5", and "9". Moreover, the packet processing apparatus sets the gate state to the normal state at the timing of downstream line subframe numbers "1" to "3" and "6" to "8".

However, in a case where the index value "1" is switched to the index value "2", the link direction of the packet processing apparatus changes from the uplink to the downlink at the timing of subframe numbers "3" and "8". Then, the gate states of the downstream line subframe numbers "3" and "8", which are to be originally protected at the index value "2", are not set to the priority state. As a result, the high-priority packet may not be preferentially output at the downstream line subframe numbers "3" and "8". That is, for example, the output latency of the high-priority packet may not be suppressed due to the dynamic change of the index value based on the TDD scheme.

In view of the above, a packet processing apparatus of a first embodiment is proposed to deal with such a situation.

First Embodiment

Figure 1:
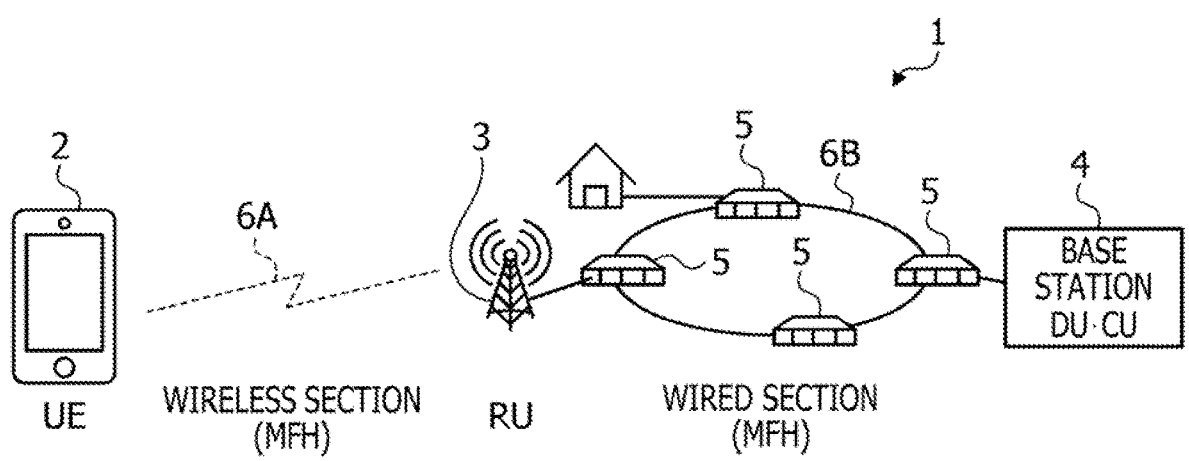
FIG. 1 is an explanatory diagram illustrating an exemplary communication system according to a first embodiment.

FIG. 1 is an explanatory diagram illustrating an exemplary communication system 1 according to a first embodiment. The communication system 1 illustrated in FIG. 1 is a 5G communication system including user equipment (UE) 2, a remote unit (RU) 3, a base station 4, and a packet processing apparatus 5. The UE 2 is, for example, a terminal device such as a 5G smartphone. The RU 3 is, for example, a distributed station such as a 5G antenna to be connected to a plurality of pieces of the UE 2 by wireless communication based on a dynamic TDD scheme. The base station 4 is, for example, a central station of a distributed unit (DU) and a central unit (CU) to be connected to a plurality of RUs 3 by wired communication based on a full-duplex communication scheme. The packet processing apparatus 5 is a packet switch that connects to the RU 3 by wired communication based on the full-duplex communication and also connects to the base station 4 by wired communication based on the full-duplex communication. The section between the UE 2 and the RU 3 is a wireless section 6A of mobile fronthaul (MFH) to be connected by wireless communication based on the dynamic TDD scheme. The section between the RU 3 and the base station 4 is a wired section 68 to be connected by wired communication based on the full-duplex communication scheme via the packet processing apparatus 5. The packet processing apparatus 5 transmits high-priority packets and low-priority packets in the wired section 6B. While the high-priority packets are MFH packets, the low-priority packets are non-MFH packets such as mobile backhaul (MBH) packets, for example.

Figure 2:
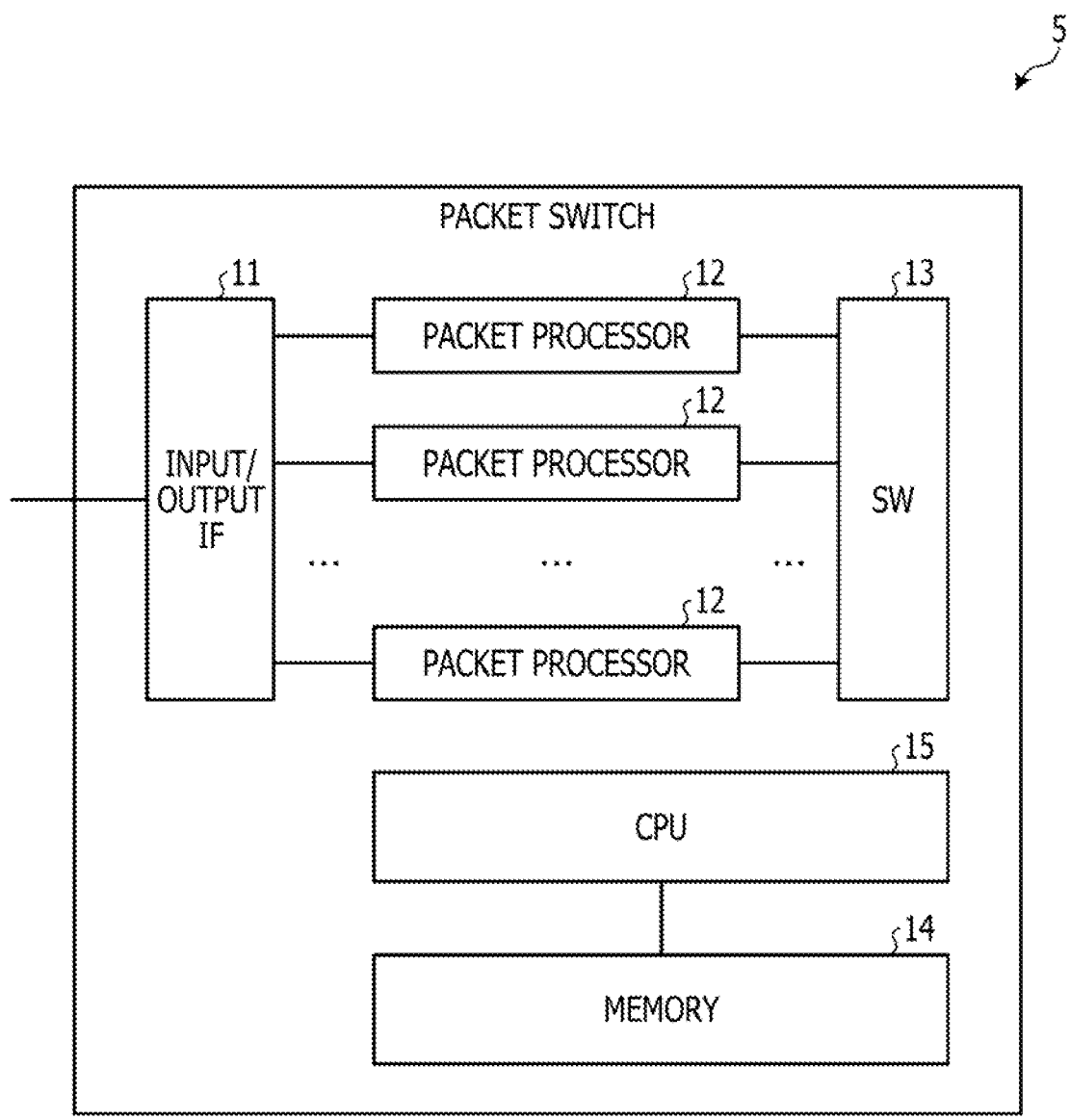
FIG. 2 is an explanatory diagram illustrating an exemplary hardware configuration of a packet switch.

FIG. 2 is an explanatory diagram illustrating an exemplary hardware configuration of the packet processing apparatus 5. The packet processing apparatus 5 illustrated in FIG. 2 includes an input/output interface (IF) 11, a plurality of packet processors 12, a switch (SW) 13, a memory 14, and a central processing unit (CPU) 15. The input/output IF 11 is an IF that connects to various lines such as a backbone line and inputs/outputs packets. The input/output IF 11 is, for example, an interface that connects to the RU 3 to be connected to a backbone line, the base station 4, and another packet processing apparatus 5. The packet processor 12 executes packet processing to which the TAS method is applied. The SW 13 is a switch that switches input and output of the packet processor 12. The memory 14 is an area for storing various kinds of information. The CPU 15 controls the entire packet processing apparatus 5.

Figure 3:
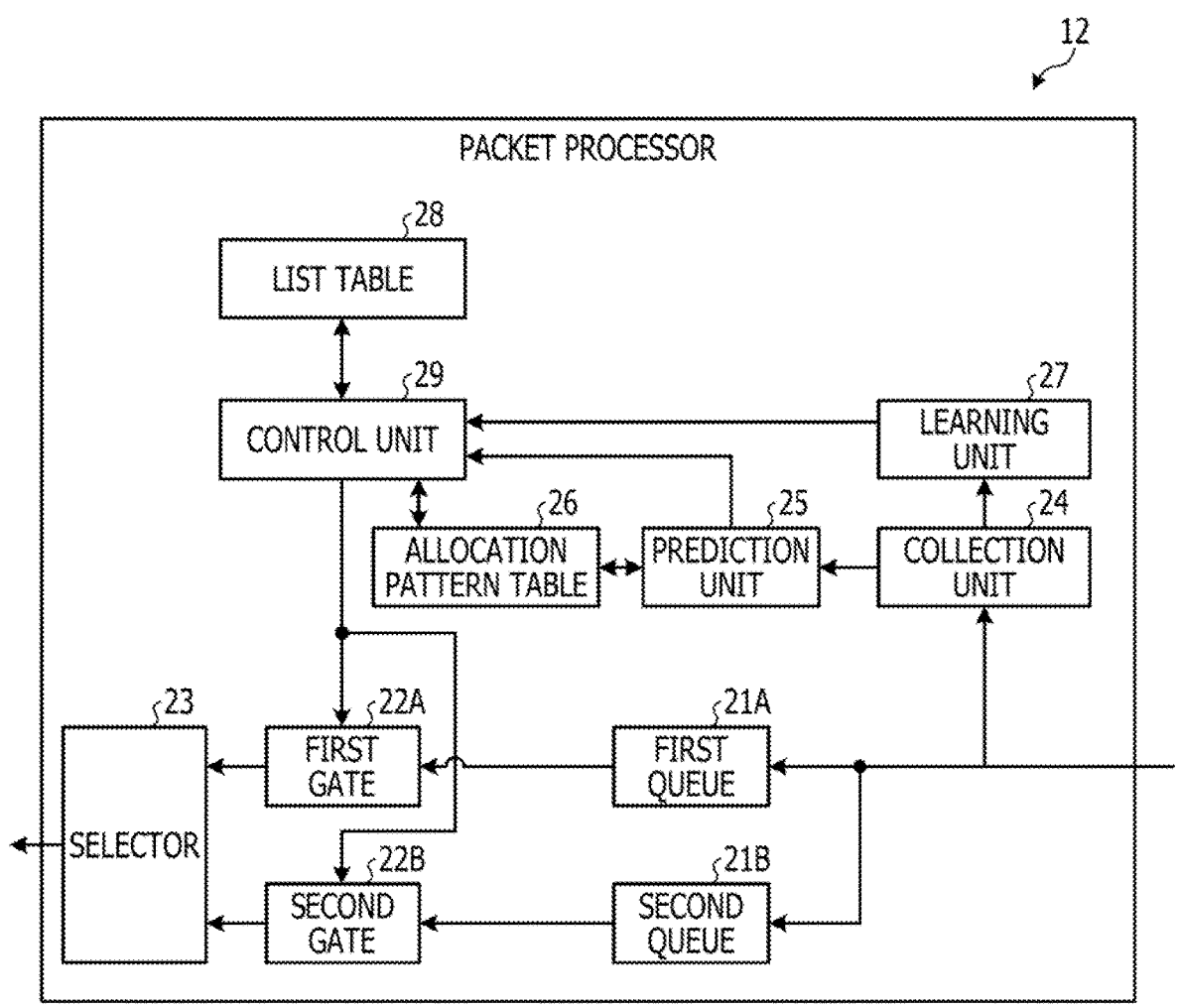
FIG. 3 is an explanatory diagram illustrating an exemplary configuration of a packet processor according to the first embodiment.

FIG. 3 is an explanatory diagram illustrating an example of the packet processor 12 according to the first embodiment. The packet processor 12 illustrated in FIG. 3 includes a first queue 21A, a second queue 21B, a first gate 22A, a second gate 22B, and a selector 23. The packet processor 12 includes a collection unit 24, a prediction unit 25, an allocation pattern table 26, a learning unit 27, a list table 28, and a control unit 29. The first queue 21A is a storage part for queuing MFH packets among the incoming packets being received. The first queue 21A identifies a P-bit of a virtual local area network (VLAN) tag in the received packet, and in a case where the received packet is an MFH packet, queues the MFH packet based on the identification result. The second queue 21B is a storage part for queuing, for example, non-MFH packets such as MBH packets among the incoming packets being received. The second queue 21B identifies the P-bit of the VLAN tag in the received packet, and in a case where the received packet is a non-MFH packet, queues the non-MFH packet based on the identification result. As a result, by preferentially outputting the MFH packet, it becomes possible to suppress output latency of the MFH packet while avoiding contention with the non-MFH packet.

The first gate 22A opens and closes the output of the MFH packets in the first queue 21A. The second gate 22B opens and closes the output of the non-MFH packets in the second queue 21B. The selector 23 selectively outputs the output of the first gate 22A or the second gate 22B. In a case where the gate states of the first gate 22A and the second gate 22B are priority states, the selector 23 preferentially outputs the MFH packets. Furthermore, in a case where the gate states of the first gate 22A and the second gate 22B are normal states, the selector 23 selectively outputs the MFH packets and the non-MFH packets. For example, there is a method in which the selector 23 autonomously executes an alternative selection according to a hardware logic implemented in advance, such as round robin.

The collection unit 24 collects the flow rate of received packets for each time period. Note that the flow rate of the packet is, for example, the total number of packets or bytes for each time slot (TS) in a subframe, or of packets or bytes in subframe or frame units in which the value is added. The prediction unit 25 monitors the flow rate of uplink received packets and the flow rate of downlink received packets, and predicts a case where the flow rate of one link is high and the flow rate of the other link is low. Furthermore, the prediction unit determines that there is a change in the link ratio on the basis of such prediction. The prediction unit 25 predicts, according to the change in the link ratio, an index value corresponding to the next allocation pattern from the allocation pattern table 26. The index value based on the dynamic TDD scheme includes, for example, seven kinds of index values of "0" to "6".

Figures 4A, 4B:
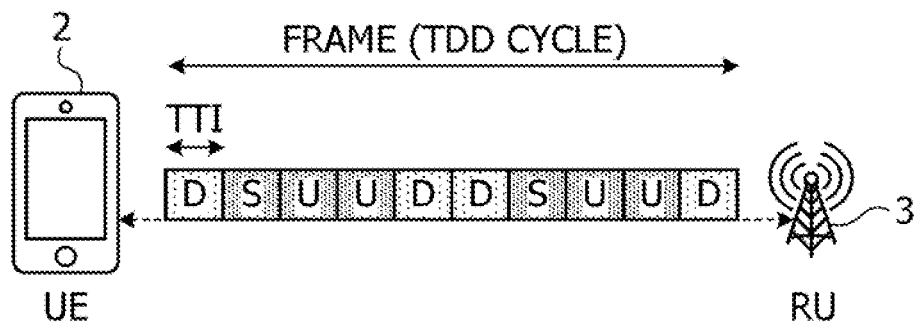
FIG. 4A is an explanatory diagram illustrating an exemplary TDD cycle of subframes in a wireless section.
FIG. 4B is an explanatory diagram illustrating an exemplary allocation pattern table.

FIG. 4A is an explanatory diagram illustrating an exemplary TDD cycle of subframes in the wireless section 6A. The wireless section 6A between the UE 2 and the RU 3 is connected by wireless communication of subframes in a TDD cycle. FIG. 4B is an explanatory diagram illustrating an example of the allocation pattern table 26. The allocation pattern table 26 is, for example, a table in which one TDD cycle includes ten subframes (TTI) of a predetermined period and manages, for each index value 26B, allocation patterns including uplink and downlink link directions to be allocated for each subframe number 26A. The subframe number 26A is a number for identifying a subframe (TTI) within the TDD cycle, and the number thereof is ten from "0" to "9" as illustrated in FIG. 4B. The link direction includes "D" indicating the downlink direction, "U" indicating the uplink direction, and "S" indicating a special link direction. Note that "S" is included in, for example, the uplink direction for convenience of explanation. With regard to the allocation pattern of the index value "1", for example, the downlink direction is allocated to the timing of subframe numbers "0", "4", "5", and "9", and the uplink direction is allocated to the timing of subframe numbers "1" to "3" and "6" to "8". With regard to the allocation pattern of the index value "2", for example, the downlink direction is allocated to the timing of subframe numbers "0", "3" to "5", "8", and "9", and the uplink direction is allocated to the timing of subframe numbers "1", "2", "6", and "7". Furthermore, with regard to the allocation pattern of the index value "6", for example, the downlink direction is allocated to the timing of subframe numbers "0", "5", and "9", and the uplink direction is allocated to the timing of subframe numbers "1" to "4" and "6" to "8".

The learning unit 27 analyzes the flow rate of the MFH packets for each TS in the uplink subframe, and learns the periodicity pattern of the uplink MFH packets. Furthermore, the learning unit 27 analyzes the flow rate of the MFH packets for each TS in the downlink subframe, and learns the periodicity pattern of the downlink MFH packets. The learning unit 27 updates the table content of the list table 28 on the basis of the learning result of the learning unit 27.

FIG. 5 is an explanatory diagram illustrating an example of the list table 28. The list table 28 illustrated in FIG. 5 manages a TS number 28A, a gate state 28B of the first gate 22A, a gate state 28C of the second gate 22B, and a retention time 28D in association with each other. The TS number 28A is a number for identifying the TS of the received packet. The gate state 28B of the first gate 22A is gate opening/closing information indicating an open (O)/closed (C) state of the first gate 22A. The gate state 28C of the second gate 22B is gate opening/closing information indicating an open/closed state of the second gate 22B. The retention time 28D is an allocation time of the TS number 28A. The TS number 28A may be appropriately changed within the range of 1 to X. The gate state 28B of the first gate 22A and the gate state 28C of the second gate 22B may also be appropriately changed for each T number 28A. The retention time 28D may also be appropriately changed for each TS number 28A.

The control unit 29 refers to the list table 28 and sets the first gate 22A and the second gate 22B to be the gate state of the 3 number "1" at the timing of the TS number "1". Next, the control unit 29 sets the first gate 22A and the second gate 22B to be the gate state of the TS number "2" at the timing of the TS number "2". Moreover, the control unit 29 sequentially sets the first gate 22A and the second gate 22B to be respective gate states at the timing of respective TS numbers "3" to "N". Then, the control unit 29 sets the gate state of the TS number "N", and then returns to the TS number "1" again to set the gate state of the TS number "1" and to sequentially set the gate states at the timing of the respective TS numbers "2" to "N". That is, for example, the control unit 29 refers to the list table 28 and cyclically repeats to sequentially set the first gate 22A and the second gate 22B to be the gate states at the timing of the respective TS numbers "1" to "X".

The control unit 29 updates the table content of the list table 28 on the basis of the analysis result of the learning unit 27. The control unit 29 updates, for each link direction, the TS number and the retention time for each TS number in the list table 28 on the basis of the periodicity pattern of the received packet. Moreover, the control unit 29 updates the gate states of the first gate 22A and the second gate 22B in the list table 28 for each TS number on the basis of the periodicity pattern. The control unit 29 predicts the arrival timing of the MFH packet, which is the high-priority packet, on the basis of the flow rate of the MFH packets in the received packets. Note that the gate state indicates the open/closed state of the first gate 22A and the second gate 22B, which is, for example, open and closed. Note that, since the MFH packet is a high-priority packet and the non-MFH packet is a low-priority packet, the control unit 29 keeps the first gate 22A open at all times, and sets the second gate 22B to be open or closed in TS units. When the first gate 22A is open, it outputs the MFH packet being held in the first queue 21A. When the second gate 22B is open, it outputs the non-MFH packet being held in the second queue 21B, and when it is closed, it outputs the MFH packet being held in the first queue 21A while stopping the output of the non-MFH packet being held in the second queue 21B.

In a case where the gate states of the first gate 22A and the second gate 22B are the priority states in the upstream line, the control unit 29 sets the first gate 22A to open and the second gate 22B to closed. The selector 23 preferentially outputs the MFH packet being held in the first queue 21A to the upstream line. Furthermore, in a case where the gate states of the first gate 22A and the second gate 22B are the normal states in the upstream line, the control unit 29 sets the first gate 22A and the second gate 22B to open. The selector 23 selectively outputs the MFH packet or the non-MFH packet to the upstream line.

Furthermore, in a case where the gate states of the first gate 22A and the second gate 22B are the priority states in the downstream line, the control unit 29 sets the first gate 22A to open and the second gate 22B to closed, thereby preferentially outputting the MFH packet being held in the first queue 21A to the downstream line. Furthermore, in a case where the gate states of the first gate 22A and the second gate 22B are the normal states in the downstream line, the control unit 29 sets the first gate 22A and the second gate 22B to open, thereby selectively outputting the MFH packet or the non-MFH packet to the downstream line.

Figure 6:
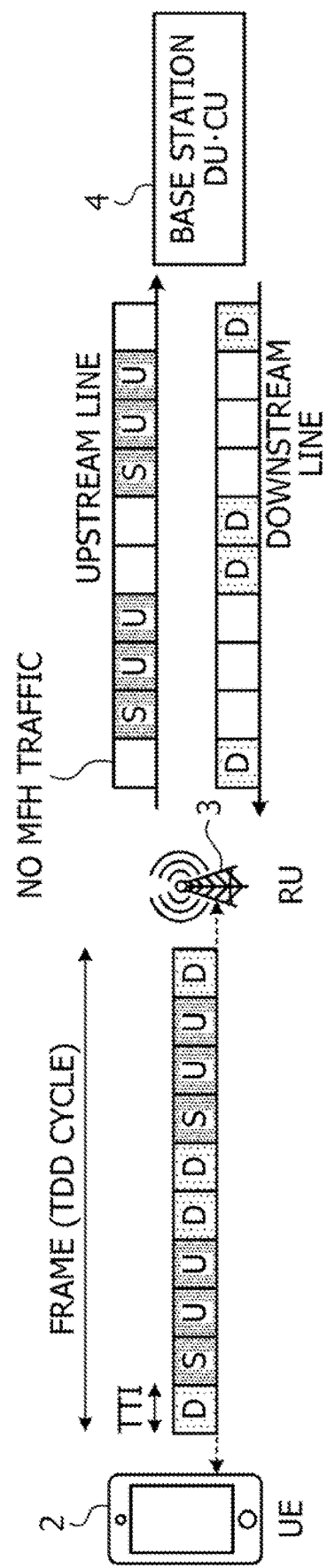
FIG. 6 is an explanatory diagram illustrating an exemplary allocation pattern in a wireless section and a wired section.

FIG. 6 is an explanatory diagram illustrating an exemplary allocation pattern in the wireless section 6A and the wired section 6B. The wireless section 6A is a section in which wireless signals are transmitted between the UE 2 and the RU 3 in an allocation pattern of the dynamic TDD cycle. The wired section 6B is a section in which packets are transmitted between the RU 3 and the base station 4 by wired communication based on the full-duplex communication of the upstream line of the uplink and the downstream line of the downlink. The RU 3 illustrated in FIG. 6 transmits downlink wireless signals to the UE 2 at the timing of subframe numbers "0", "4", "5", and "9", and receives uplink wireless signals from the UE 2 at the timing of subframe numbers "1" to "3" and "6" to "8". The RU 3 transmits the packets to the base station 4 through the upstream line via the packet processing apparatus 5 at the timing of the subframe numbers "1" to "3" and "6" to "8". Furthermore, the RU 3 receives the packets from the base station 4 through the downstream line via the packet processing apparatus 5 at the timing of the subframe numbers "0", "4", "5", and "9". Note that the packet processing apparatus 5 receives the packets from the RU 3 through the upstream line at the timing of the subframe numbers "1" to "3" and "6" to "8". Furthermore, the packet processing apparatus 5 transmits the packets from the base station 4 to the RU 3 through the downstream line at the timing of the subframe numbers "0", "4", "5", and "9". In a similar manner, the packet processing apparatus 5 transmits the packets from the RU 3 to the base station 4 through the upstream line at the timing of the subframe numbers "1" to "3" and "6" to "8". Furthermore, the packet processing apparatus 5 receives the packets from the base station 4 through the downstream line at the timing of the subframe numbers "0", "4", "5", and "9".

Figure 7:
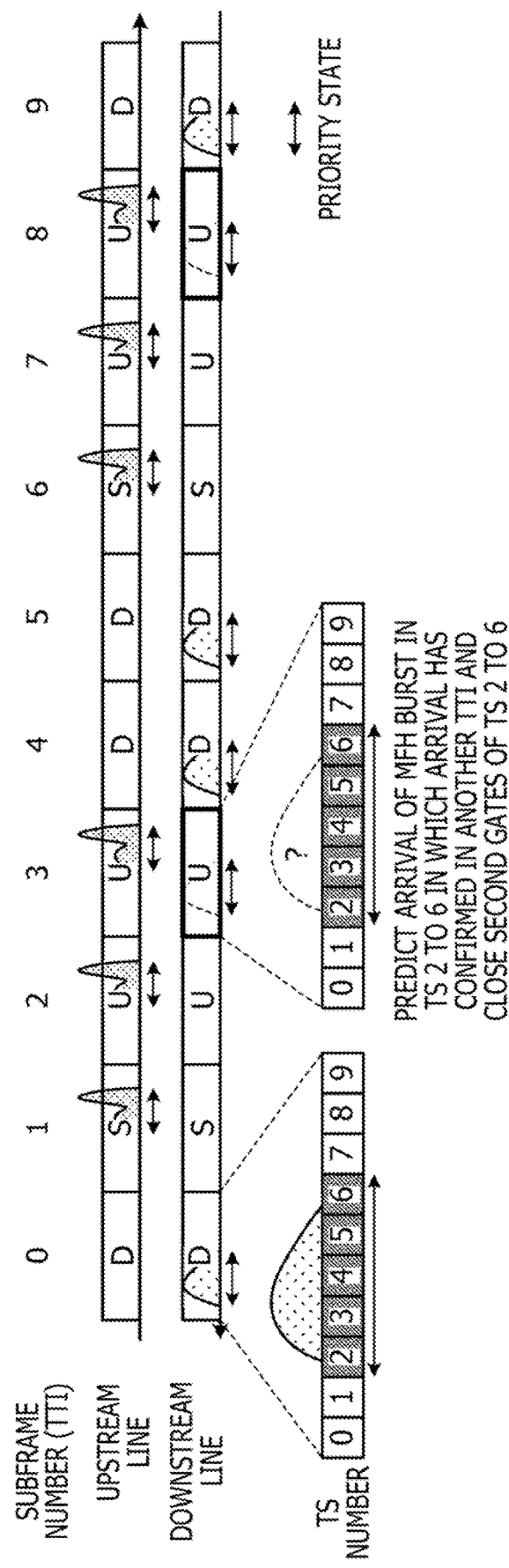
FIG. 7 is an explanatory diagram illustrating an example of a first priority setting process according to the first embodiment.

FIG. 7 is an explanatory diagram illustrating an example of a first priority setting process according to the first embodiment. Note that the following describes processing operation of the packet processing apparatus 5 at the time of setting gates of the upstream line and the downstream line when the allocation pattern of the index value "1" is switched to the allocation pattern of the index value "2". The allocation pattern of the index value "1" is a state in which the downlink direction is allocated to the timing of subframe numbers "0", "4", "5", and "9", and the uplink direction is allocated to the timing of subframe numbers "1" to "3" and "6" to "8". Furthermore, the allocation pattern of the index value "2" is a state in which the downlink direction is allocated to the timing of subframe numbers "0", "3", "4", "5", "8", and "9", and the uplink direction is allocated to the timing of subframe numbers "1", "2", "6", and "7".

The packet processing apparatus 5 sets the gate states of the predetermined TSs of downlink of the downstream line at the timing of the subframe numbers "0", "4", "5", and "9" to the priority state, and sets the gate states of the remaining TSs to the normal state. Moreover, the packet processing apparatus 5 sets the gate state of each TS at the timing of the downstream line subframe numbers "1" to "3" and "6" to "8" to the normal state. Note that, in the priority state, the first gate 22A is open and the second gate 22B is closed. In the normal state, the first gate 22A and the second gate 22B are open.

The packet processing apparatus 5 sets the gate states of the predetermined TSs of uplink of the upstream line at the timing of the subframe numbers "1" to "3" and "6" to "8" to the priority state, and sets the gate state of the remaining TSs to the normal state. Moreover, the packet processing apparatus 5 sets the gate state of each TS at the timing of the upstream line subframe numbers "0", "4", "5", and "9" to the normal state.

It is assumed that the prediction unit 25 has predicted a change from the allocation pattern of the index value "1" to the allocation pattern of the index value "2". In a case where a change to the allocation pattern of the index value "2" is predicted, the control unit 29 determines that there is a change in the link direction from the uplink to the downlink (U to D) within the same subframe (subframe numbers "3" and "8") between the allocation pattern immediately before the prediction (index value "1") and the allocation pattern of the prediction result (index value "2").

In a case where there is a change in the link direction from the uplink to the downlink within the same subframe (subframe numbers "3" and "8"), the control unit 29 specifies a periodicity pattern of the changed link direction (downlink direction). The control unit 29 sets the gate states of the predetermined TSs (TS 2 to TS 6) in the subframes (subframe numbers "3" and "8") in the link direction (downlink direction) corresponding to the specified periodicity pattern to the priority state. Moreover, the control unit 29 sets the gate states of the remaining TSs, such as TS 0, TS 1, and TS 7 to TS 9, to the normal state. Note that the predetermined TSs are TSs in which the MFH packets are scheduled to arrive corresponding to the periodicity pattern of the MFH packets in the downlink direction.

That is, as described above, for example, it becomes possible to apply the operation in the downstream line to the upstream line, and as a result thereof, the gate states of the predetermined TSs (TS 2 to TS 6) are set to the priority state and the gate states of TSs other than the predetermined TSs (TS 0, TS 1, and TS 7 to TS 9) are set to the normal state even at the timing of the subframe numbers "3" and "8" in the upstream line. Therefore, it becomes possible to suppress output latency of the MFH packets both in the upstream line and in the downstream line in the predetermined TSs at the timing of the subframe numbers "3" and "8".

In a case where a change in the link direction within the same subframe is predicted between the allocation pattern immediately before the prediction and the allocation pattern of the prediction result, the gate state of the predetermined TS in the subframe in which the link direction has changed is set to the priority state, and the gate states of TSs other than the predetermined TS are set to the normal state. As a result, even in a case where a dynamic change to the index value based on the dynamic TDD scheme in the wireless section 6A is predicted, it becomes possible to suppress output latency of the MFH packets while the index value in which the dynamic change is predicted is being reflected.

Besides, even in the case of setting the gate state of the subframe to the priority state, not all gate states of all TSs within the subframe are set to the priority state, but only the gate states of the predetermined TSs corresponding to the periodicity pattern of the MFH packets are set to the priority state. Then, the gate states of TSs other than the predetermined TSs are set to the normal state. As a result, reduction of output opportunities of non-MFH packets due to the priority output of MFH packets is suppressed, whereby it becomes possible to improve the total throughput of packet output.

The control unit 29 determines that the state in which there is a change in the link direction (U to D) in the same subframe (subframe numbers "3" and "8") between the allocation pattern of the prediction result and the current allocation pattern has transitioned to the state in which the change disappears (D to U). In this case, the control unit 29 switches the gate state of the predetermined TS that has transitioned to the state in which the change disappears from the priority state to the normal state. That is, for example, at the timing of the subframe numbers "3" and "8", the gate states of the predetermined TSs (TS 2 to TS 6) are set to the priority state in the upstream line, and the gate states of TSs other than the predetermined TSs (TS 0, TS 1, and TS 7 to TS 9) are set to the normal state. Moreover, at the timing of the subframe numbers "3" and "8", the gate states of TS 0 to TS 9 are set to the normal state in the downstream line. As a result, by canceling the priority state set in the same subframe (subframe numbers "3" and "8") in the upstream line and the downstream line as the index value is fixed, it becomes possible to suppress reduction of output opportunities of non-MFH packets due to the priority output of MFH packets.

Figure 8:
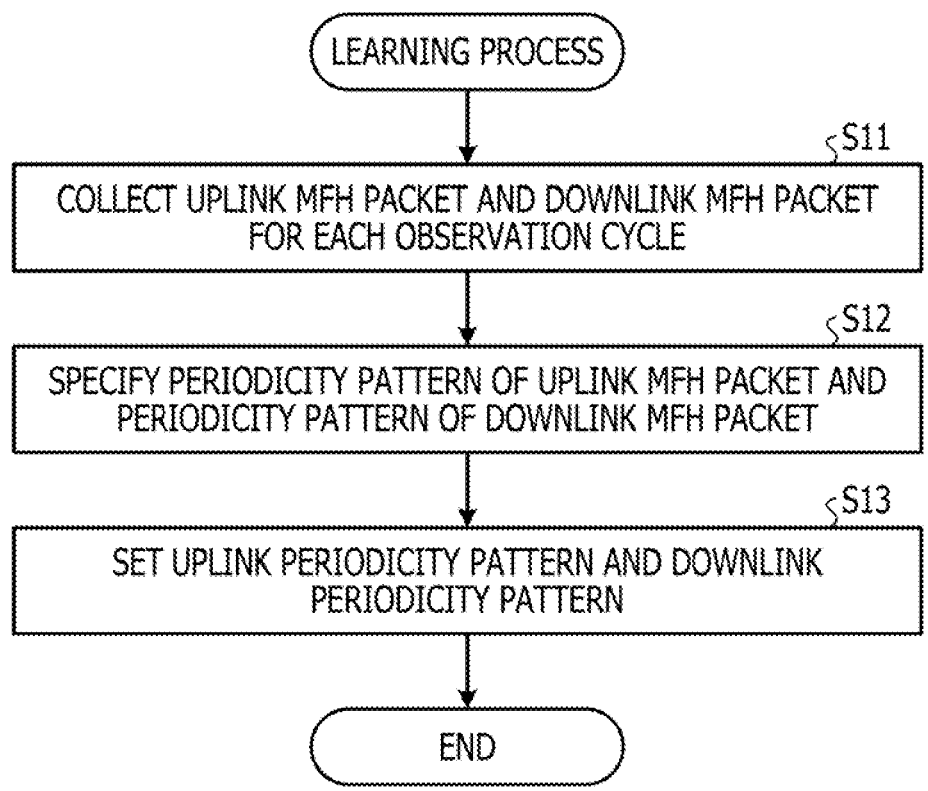
FIG. 8 is a flowchart illustrating exemplary processing operation of the packet processor related to a learning process.

FIG. 8 is a flowchart illustrating exemplary processing operation of the packet processor 12 related to a learning process. In FIG. 8, the collection unit 24 of the packet processor 12 collects the flow rate of uplink MFH packets and the flow rate of downlink MFH packets for each observation cycle (step S11). Note that the collection unit 24 collects the flow rate of uplink MFH packets from the upstream line, and collects the flow rate of downlink MFH packets from the downstream line. The learning unit 27 specifies the periodicity pattern of the uplink MFH packets from the flow rate of the uplink MFH packets, and specifies the periodicity pattern of the downlink MFH packets from the flow rate of the downlink MFH packets (step S12). The learning unit 27 registers, in the list table 28, the gate states of the first gate 22A and the second gate 22B for each TS number according to the periodicity pattern of the uplink MFH packets and the periodicity pattern of the downlink MFH packets (step S13). Then, the learning unit 27 ends the processing operation illustrated in FIG. 8. That is, for example, the learning unit 27 registers, in the list table 28, the gate states of the first gate 22A and the second gate 22B for each TS number within the upstream line subframe according to the periodicity pattern of the uplink MFH packets. Note that, with regard to the gate state, the gate states of the predetermined TSs corresponding to the periodicity pattern are set to the priority state, and the gate states of TSs other than the predetermined TSs are set to the normal state. Moreover, the learning unit 27 registers, in the list table 28, the gate states of the first gate 22A and the second gate 22B for each TS number within the downstream line subframe according to the periodicity pattern of the downlink MFH packets.

The packet processor 12 is capable of specifying the periodicity pattern of the uplink MFH packets and the periodicity pattern of the downlink MFH packets, and registering the gate state for each upstream line TS number and the gate state for each downstream line TS number. As a result, it becomes possible to secure a gate state capable of suppressing output latency of the MFH packets for each of the upstream line and the downstream line.

Figure 9:
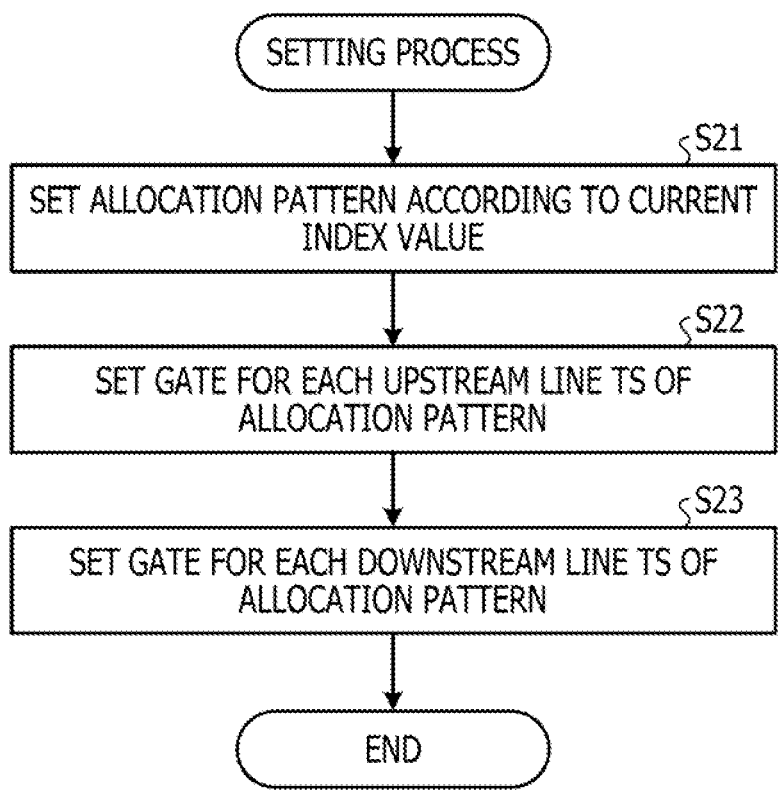
FIG. 9 is a flowchart illustrating exemplary processing operation of the packet processor related to a setting process.

FIG. 9 is a flowchart illustrating exemplary processing operation of the packet processor 12 related to a setting process. In FIG. 9, the control unit 29 of the packet processor 12 sets an allocation pattern according to the current index value of the wireless section 6A (step S21). The control unit 29 specifies an index value according to the link ratio between the flow rate of uplink received packets in the wireless section 6A and the flow rate of downlink received packets in the wireless section 6A. The control unit 29 sets the gate states of the first gate 22A and the second gate 22B according to the periodicity pattern of the uplink MFH packets for each TS within the upstream line subframe of the allocation pattern being set (step S22). Note that the control unit 29 sets the gate states of the predetermined TSs corresponding to the periodicity pattern of the uplink MFH packets to the priority state, and sets the gate states of TSs other than the predetermined TSs to the normal state. Moreover, the control unit 29 sets the gate states of the first gate 22A and the second gate 22B according to the periodicity pattern of the downlink MFH packets for each TS within the downstream line subframe of the allocation pattern being set (step S23), and ends the processing operation illustrated in FIG. 9. Note that the control unit 29 sets the gate states of the predetermined TSs corresponding to the periodicity pattern of the downlink MFH packets to the priority state, and sets the gate states of TSs other than the predetermined TSs to the normal state.

The packet processor 12 sets the gate states of the first gate 22A and the second gate 22B according to the periodicity pattern of the uplink MFH packets for each upstream line TS. The packet processor 12 sets the gate states of the first gate 22A and the second gate 22B according to the periodicity pattern of the downlink MFH packets for each TS within the downlink subframe. As a result, the packet processor 12 is capable of setting a gate state for each uplink or downlink TS.

Figure 10:
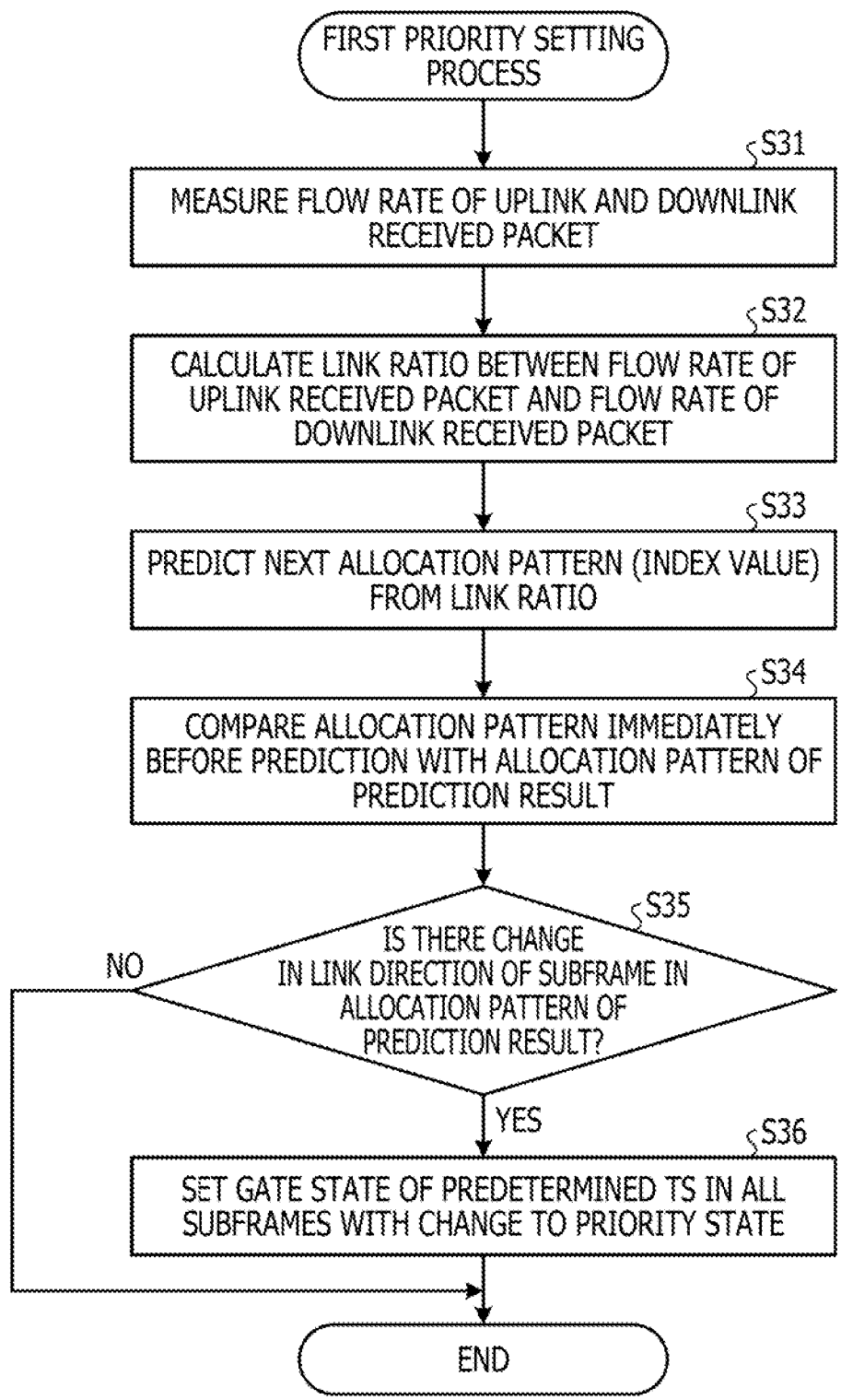
FIG. 10 is a flowchart illustrating exemplary processing operation of the packet processor related to the first priority setting process.

FIG. 10 is a flowchart illustrating exemplary processing operation of the packet processor 12 related to the first priority setting process. In FIG. 10, the collection unit 24 measures the flow rate of uplink received packets and the flow rate of downlink received packets (step S31). The prediction unit 25 calculates the link ratio between the flow rate of the uplink received packets and the flow rate of the downlink received packets (step S32). The link ratio is a ratio between the flow rate of the uplink received packets and the flow rate of the downlink received packets.

The prediction unit 25 refers to the allocation pattern table 26, and predicts the next allocation pattern according to the link ratio (step S33). The control unit 29 compares the allocation pattern immediately before the prediction with the allocation pattern of the prediction result (step S34), and determines, from the comparison result, whether there is a change in the link direction of the same subframe between the allocation pattern of the prediction result and the allocation pattern immediately before the prediction (step S35). The change in the link direction of the same subframe corresponds to, for example, a change from the uplink "U" to the downlink "D" at the timing of the subframe numbers "3" and "8" illustrated in FIG. 7.

In a case where there is a change in the link direction of the same subframe (Yes in step S35), the control unit 29 sets the gate states of the predetermined TSs within the subframe with a change in the link direction to the priority state (step S36), and ends the processing operation illustrated in FIG. 10. Note that the predetermined TSs are predetermined TSs (TS 2 to TS 6) of the downstream line within the timing of the subframe numbers "3" and "8" at which a change from the uplink "U" to the downlink "D" is present. The gate states of TSs (TS 0, TS 1, and TS 7 to TS 9) other than the predetermined TS 2 to TS 6 within the timing of the subframe numbers "3" and "8" are set to the normal state. In a case where there is no change in the link direction of the same subframe (No in step S35), the control unit 29 ends the processing operation illustrated in FIG. 10.

The packet processor 12 compares the allocation pattern immediately before the prediction (index value "1") with the allocation pattern of the prediction result (index value "2"). The packet processor 12 determines that there is a change in the link direction from the uplink to the downlink within the same subframe (subframe numbers "3" and "8") between the allocation pattern immediately before the prediction and the allocation pattern of the prediction result. In a case where there is a change in the link direction from the uplink to the downlink, the packet processor 12 sets the gate states of the predetermined TSs (TS 2 to TS 6) within the downstream line subframe corresponding to the periodicity pattern of the link direction (downlink) with the change to the priority state. As a result, even in a case where the index value based on the dynamic TDD scheme in the wireless section 6A has dynamically changed, it becomes possible to suppress output latency of MFH packets while the dynamically changed index value is being reflected.

Besides, even in the case of setting the gate state of the subframe to the priority state, not all gate states of all TSs within the subframe are set to the priority state, but only the gate states of the predetermined TSs corresponding to the periodicity pattern of the MFH packets are set to the priority state. Then, the gate states of TSs other than the predetermined TSs are set to the normal state. As a result, reduction of output opportunities of non-MFH packets due to the priority output of MFH packets is suppressed, whereby it becomes possible to improve the total throughput of packet output.

Second Embodiment

Figure 11:
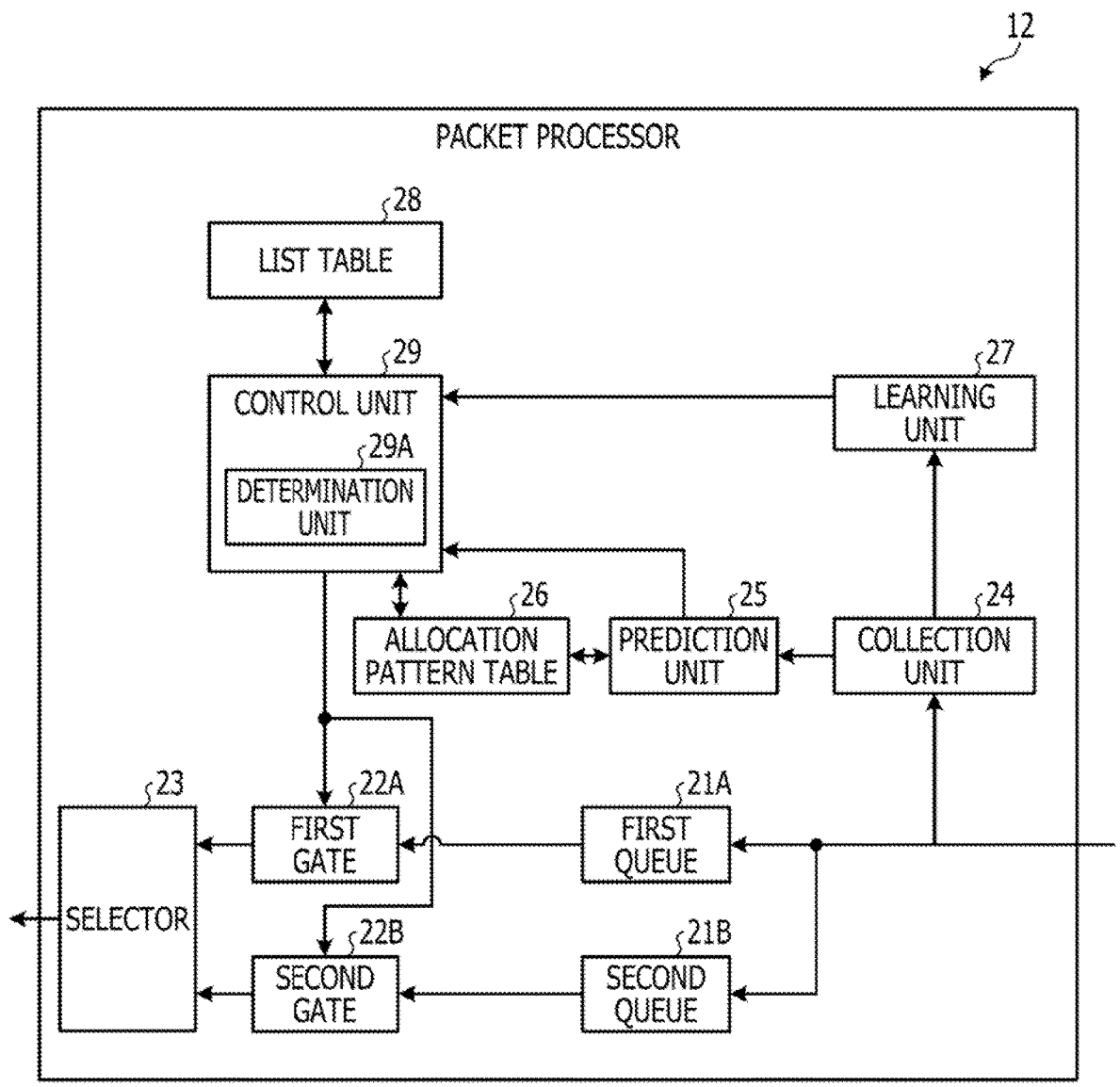
FIG. 11 is an explanatory diagram illustrating an exemplary configuration of a packet processor according to a second embodiment.

Note that description of overlapping configurations and operations is omitted by providing the same reference signs to the same configurations as those of the first embodiment. FIG. 11 is an explanatory diagram illustrating an exemplary configuration of a packet processor 12 according to a second embodiment. A control unit 29 illustrated in FIG. 11 includes a determination unit 29A. In a case where there is a change in the link direction within the same subframe between the allocation pattern immediately before a prediction and the allocation pattern of a prediction result, the determination unit 29A identifies a head TS in predetermined TSs within the subframe with the change in the link direction. Moreover, the determination unit 29A sets the gate state of the head TS to a priority state. The determination unit 29A determines whether an MFH packet has arrived at the head TS.

In a case where an MFH packet has arrived at the head TS, the control unit 29 sets the gate states of the predetermined TSs within the subframe of the link direction corresponding to the periodicity pattern in the link direction with the change to the priority state. In a case where an MFH packet has not arrived at the head 3, the control unit 29 sets the gate states of the predetermined TSs other than the head TS within the subframe of the link direction corresponding to the periodicity pattern in the link direction with the change to a normal state.

Figure 12:
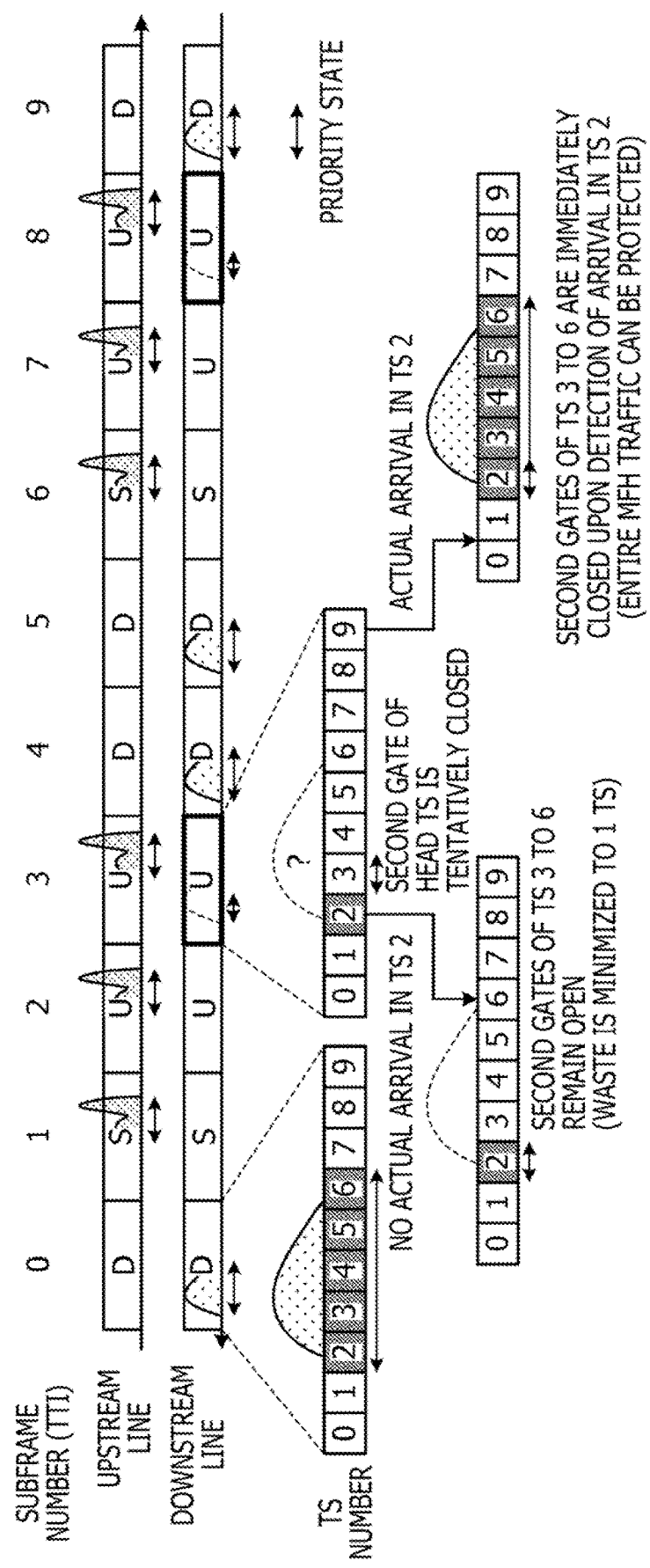
FIG. 12 is an explanatory diagram illustrating an example of a second priority setting process according to the second embodiment.

FIG. 12 is an explanatory diagram illustrating an example of a second priority setting process according to the second embodiment. Note that the following describes processing operation of a packet processing apparatus 5 at the time of, for example, setting gates of the upstream line and the downstream line when the allocation pattern of the index value "1" is switched to the allocation pattern of the index value "2".

It is assumed that the prediction unit 25 has predicted a change from the allocation pattern of the index value "1" to the allocation pattern of the index value "2". In a case where the change to the allocation pattern of the index value "2" can be predicted, the control unit 29 compares the allocation pattern immediately before the prediction (index value "1") with the allocation pattern of the prediction result (index value "2"). The control unit 29 determines that there is a change in the link direction from the uplink to the downlink within the same subframe (subframe numbers "3" and "8") between the allocation pattern immediately before the prediction and the allocation pattern of the prediction result.

In a case where there is a change in the link direction from the uplink to the downlink, the control unit 29 identifies a head TS (TS 2) in the predetermined TSs (TS 2 to TS 6) within the subframe in the link direction corresponding to the periodicity pattern of the link direction (downstream line) with the change. The control unit 29 sets the gate state of the head TS to the priority state. The control unit 29 determines whether an MFH packet has arrived in the head TS. In a case where an MFH packet has arrived in the head TS, the control unit 29 sets the gate states of the predetermined TSs (TS 2 to TS 6) to the priority state. That is, as described above, for example, it becomes possible to apply the operation in the downstream line to the upstream line, and as a result thereof, the gate states of the predetermined TSs (TS 2 to TS 6) are set to the priority state and the gate states of TSs other than the predetermined TSs (TS 0, TS 1, and TS 7 to TS 9) are set to the normal state at the timing of the subframe numbers "3" and "8" both in the upstream line and in the downstream line. Therefore, it becomes possible to suppress output latency of the MFH packets both in the upstream line and in the downstream line in the predetermined TSs at the timing of the subframe numbers "3" and "8".

In a case where an MFH packet has not arrived in the head TS, the control unit 29 sets the gate states of the remaining predetermined TSs (TS 3 to TS 6) to the normal state. Note that the gate states of TSs other than the predetermined TSs (TS 7 to TS 9) are also set to the normal state.

Even in a case where a change in the link direction within the same subframe between the allocation pattern immediately before the prediction and the allocation pattern of the prediction result has been predicted, the gate state of the head TS of the predetermined TSs is set to the priority state. In a case where an MFH packet has arrived in the head TS, the gate states of the predetermined TSs within the subframe in which the link direction has changed are set to the priority state. As a result, first, a bare minimum, for example, only the gate state of the head TS may be set to the priority state, and the gate states of the remaining predetermined TSs other than the head TS may be set to the priority state or the normal state according to the arrival of an MFH packet, whereby it becomes possible to suppress reduction of output opportunities of non-MFH packets. Moreover, even in a case where a change to the index value based on the dynamic TDD scheme in a wireless section 6A is predicted, it becomes possible to suppress output latency of the MFH packets while the index value in which the change is predicted is being reflected.

Besides, even in the case of setting the gate state of the subframe to the priority state, not all gate states of all TSs within the subframe are set to the priority state, but only the gate states of the predetermined TSs corresponding to the periodicity pattern of the MFH packets are set to the priority state. Then, the gate states of TSs other than the predetermined TSs are set to the normal state. As a result, reduction of output opportunities of non-MFH packets due to the priority output of MFH packets is suppressed, whereby it becomes possible to improve the total throughput of packet output.

Figure 13:
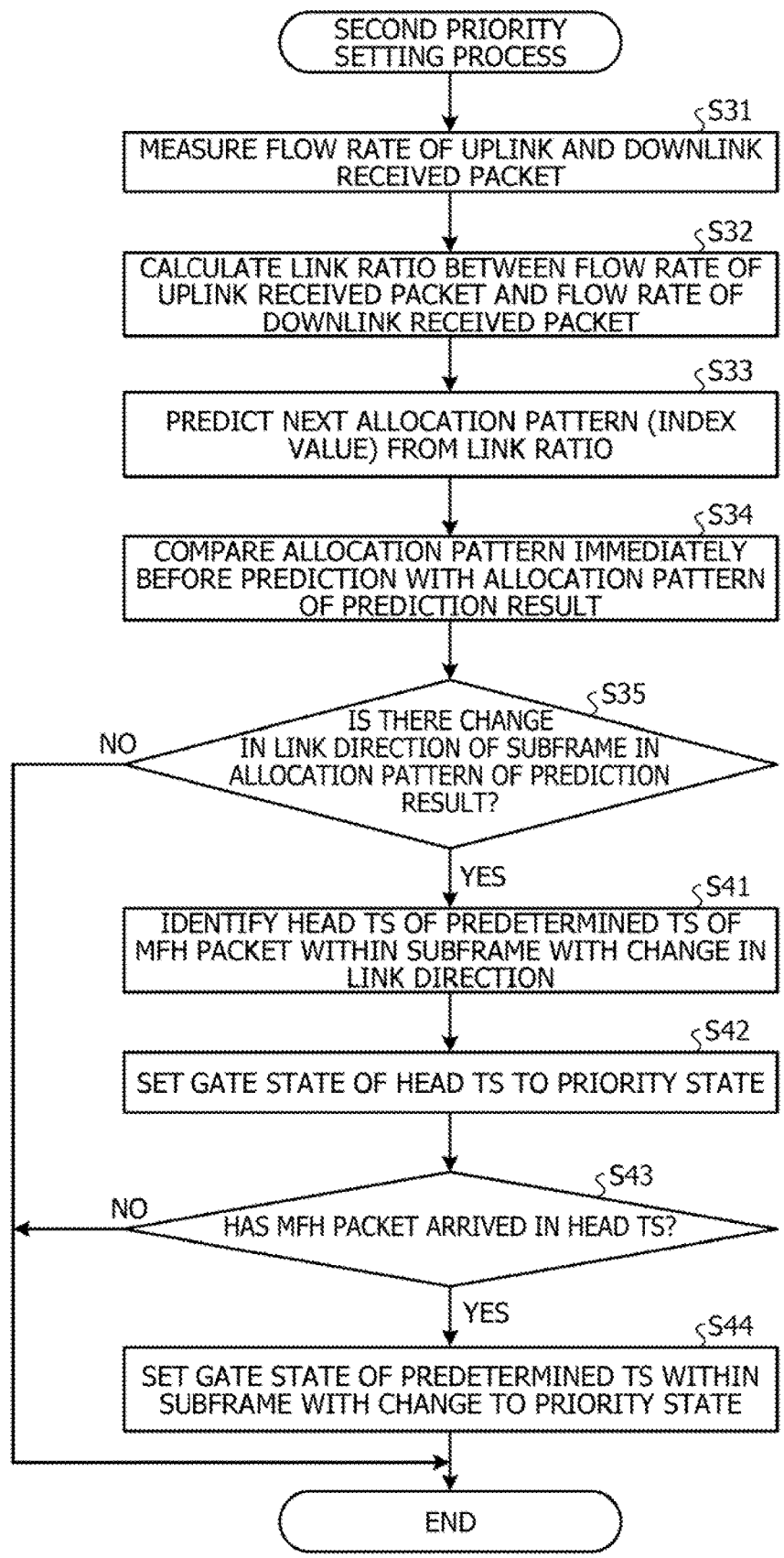
FIG. 13 is a flowchart illustrating exemplary processing operation of the packet processor related to the second priority setting process.

FIG. 13 is a flowchart illustrating exemplary processing operation of the packet processor 12 related to the second priority setting process. In FIG. 13, in a case where there is a change in the link direction within the same subframe in step S35 (Yes in step S35), the packet processor 12 identifies a head TS of the predetermined TSs of the MFH packet within the subframe with the change in the link direction (step S41). Note that, in a case where the predetermined TSs of the MFH packet are TS 2 to TS 6, the head TS is TS 2.

After identifying the head TS of the predetermined TSs, the control unit 29 sets the gate state of the head TS to the priority state (step S42). After setting the gate state of the head TS to the priority state, the determination unit 29A determines whether the MFH packet has arrived at the head TS (step S43). In a case where the MFH packet has arrived at the head TS (Yes in step S43), the determination unit 29A sets the gate states of the predetermined TSs within the subframe with the change to the priority state (step S44), and the processing operation illustrated in FIG. 13 is complete.

In a case where no MFH packet has arrived in the head TS (No in step S43), the control unit 29 ends the processing operation illustrated in FIG. 13. That is, for example, the gate states of the remaining predetermined TSs (e.g., TS 3 to TS 6) are set to the normal state.

The packet processor 12 compares the allocation pattern immediately before the prediction (index value "1") with the allocation pattern of the prediction result (index value "2"). The packet processor 12 determines that there is a change in the link direction from the uplink to the downlink within the same subframe (subframe numbers "3" and "8") between the allocation pattern immediately before the prediction and the allocation pattern of the prediction result. In a case where there is a change in the link direction from the uplink to the downlink, the packet processor 12 identifies the head TS from the predetermined TSs (TS 2 to TS 6) within the downstream line subframe corresponding to the periodicity pattern of the link direction (downlink) with the change. The packet processor 12 sets the gate state of the head TS to the priority state. The packet processor 12 determines whether MFH traffic has arrived at the head TS. In a case where the MFH traffic has arrived at the head TS, the packet processor 12 sets the gate states of the remaining predetermined TSs to the priority state. As a result, first, a bare minimum, for example, only the gate state of the head TS is set to the priority state, whereby it becomes possible to suppress reduction of output opportunities of non-MFH packets. Moreover, even in a case where the index value based on the dynamic TDD scheme in the wireless section 6A has dynamically changed, it becomes possible to suppress output latency of MFH packets while the dynamically changed index value is being reflected.

In a case where the MFH traffic has not arrived at the head TS, the packet processor 12 sets the gate states of the remaining predetermined TSs to the normal state. As a result, a bare minimum, for example, only the gate state of the head TS is set to the priority state, whereby it becomes possible to suppress reduction of output opportunities of non-MFH packets.

Besides, even in the case of setting the gate state of the subframe to the priority state, not all gate states of all TSs within the subframe are set to the priority state, but the gate states of the predetermined TSs corresponding to the periodicity pattern of the MFH packets are set to the priority state. Then, the gate states of TSs other than the predetermined TSs are set to the normal state. As a result, reduction of output opportunities of non-MFH packets due to the priority output of MFH packets is suppressed, whereby it becomes possible to improve the total throughput of packet output.

Third Embodiment

Figure 14:
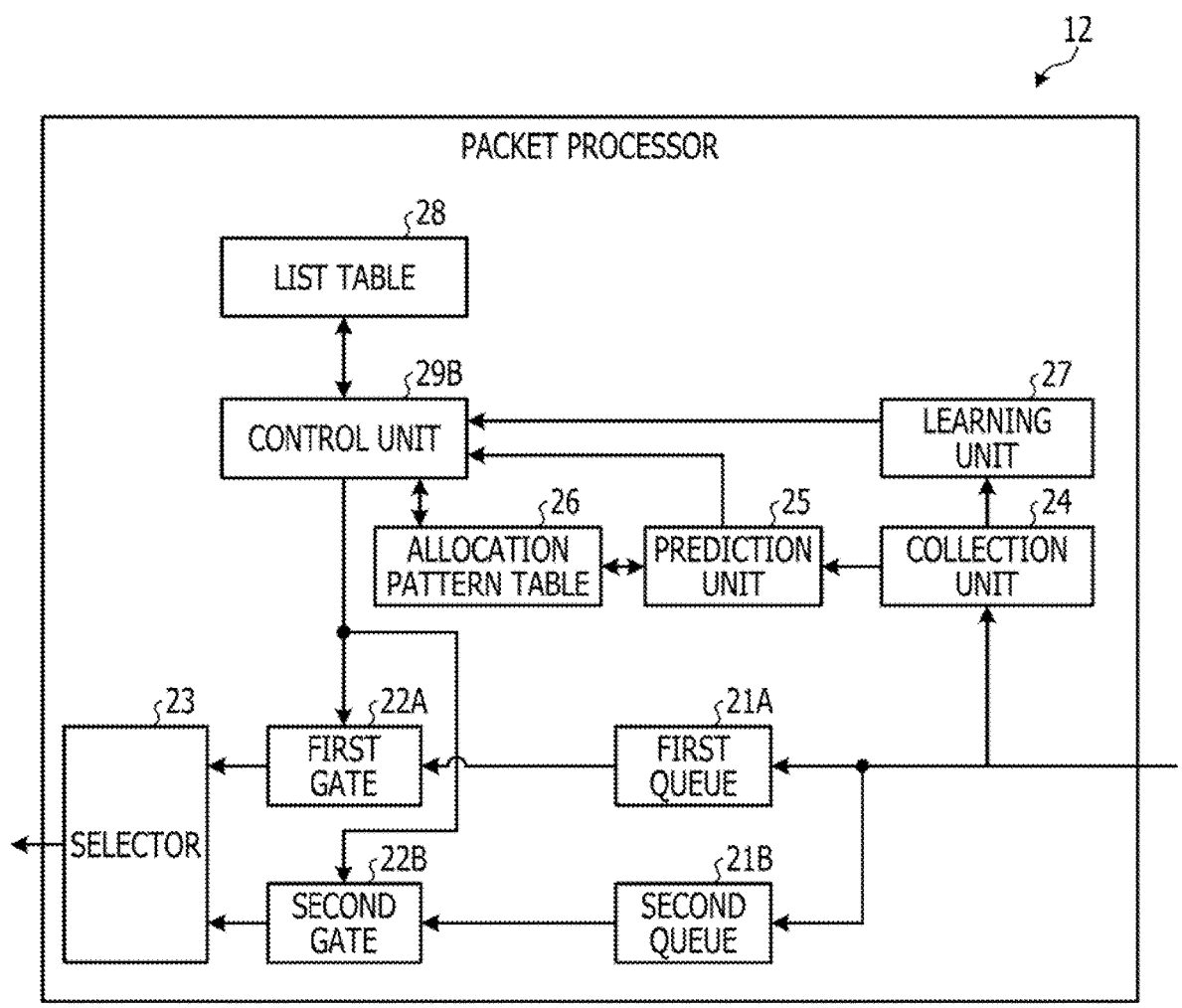
FIG. 14 is an explanatory diagram illustrating an exemplary configuration of a packet processor according to a third embodiment.

Note that description of overlapping configurations and operations is omitted by providing the same reference signs to the same configurations as those of the first embodiment. FIG. 14 is an explanatory diagram illustrating an exemplary configuration of a packet processor 12 according to a third embodiment. The packet processor 12 illustrated in FIG. 14 includes a control unit 29B instead of the control unit 29. In a case where a prediction unit 25 predicts a plurality of next allocation patterns, the control unit 29B compares each of the allocation patterns of the prediction result with the allocation pattern immediately before the prediction. Note that the case where the prediction unit predicts a plurality of allocation patterns indicates a case where the next allocation pattern fails to be specified from the link ratio and a plurality of allocation patterns is predicted. In a case where there is a change in the link direction within the same subframe between the allocation pattern immediately before the prediction and the allocation pattern of the prediction result, the control unit 29B sets the gate states of the predetermined TSs corresponding to the periodicity pattern of the link direction with the change to the priority state.

FIG. 15 is an explanatory diagram illustrating an exemplary allocation pattern table 26 in a case where a plurality of allocation patterns is predicted. The prediction unit 25 refers to the allocation pattern table 26, monitors the flow rate of uplink received packets and the flow rate of downlink received packets, and predicts the next allocation pattern from the change in the link ratio based on the monitoring.

For example, the prediction unit 25 predicts the allocation patterns of the index value "2" and the index value "4" from the index value "1".

The control unit 29B determines that there is a change in the link direction from the uplink to the downlink within the same subframe (subframe numbers "3" and "8") between the allocation pattern immediately before the prediction (index value "1") and the allocation pattern immediately after the prediction (index value "2").

The control unit 29B determines that there is a change in the link direction from the uplink to the downlink within the same subframe (subframe numbers "6" to "8") between the allocation pattern immediately before the prediction (index value "1") and the allocation pattern immediately after the prediction (index value "4").

Then, the control unit 29B determines that there is a change in the link direction from the uplink to the downlink within the same subframe (subframe numbers "3" and "6" to "8"). In a case where there is a change in the link direction from the uplink to the downlink, the control unit 29B sets the gate states of the predetermined TSs (TS 2 to TS 6) within the subframe of the link direction corresponding to the periodicity pattern of the link direction (downstream line) with the change to the priority state. As a result, even in a case where a plurality of changes in the index value based on the dynamic TDD scheme in a wireless section 6A is predicted, it becomes possible to suppress output latency of the MFH packets while a plurality of index values in which the dynamic change is predicted is being reflected.

Besides, even in the case of setting the gate state of the subframe to the priority state, the gate state of the entire subframe is not set to the priority state, but only the gate states of the predetermined TSs corresponding to the periodicity pattern of the MFH packets are set to the priority state. Then, the gate states of TSs other than the predetermined TSs are set to the normal state. As a result, reduction of output opportunities of non-MFH packets due to the priority output of MFH packets is suppressed, whereby it becomes possible to improve the total throughput of packet output.

Figure 16:
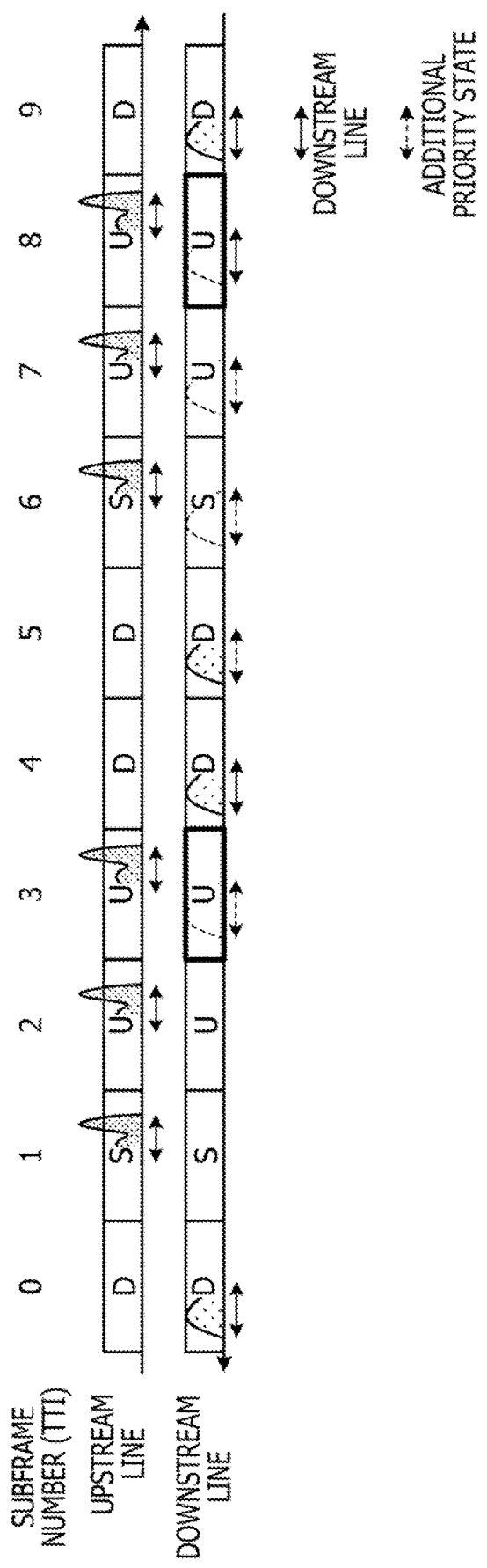
FIG. 16 is an explanatory diagram illustrating exemplary operation related to a priority setting process according to the third embodiment.

FIG. 16 is an explanatory diagram illustrating exemplary operation related to a third priority setting process according to the third embodiment. Note that the following describes processing operation of a packet processing apparatus 5 at the time of, for example, setting gates of the upstream line and the downstream line when the allocation pattern of the index value "1" is switched to the allocation pattern of the index value "2" or "4".

In a case where the index value is "1", the packet processing apparatus 5 sets the gate states of the predetermined TSs at the timing of downstream line subframe numbers "0", "5", and "9" to the priority state, and sets the gate states of TSs other than the predetermined TSs to the normal state. Moreover, the packet processing apparatus 5 sets the gate state to the normal state at the timing of downstream line subframe numbers "1" to "3" and "6" to "8". Furthermore, in a case where the index value is "1", the packet processing apparatus 5 sets the gate states of the predetermined TSs at the timing of upstream line subframe numbers "1" to "3" and "6" to "8" to the priority state, and sets the gate states of TSs other than the predetermined TSs to the normal state. Moreover, the packet processing apparatus 5 sets the gate state to the normal state at the timing of upstream line subframe numbers "0", "4", "5", and "9".

It is assumed that the prediction unit 25 has predicted a change from the allocation pattern of the index value "1" to the allocation pattern of the index value "2" and a change to the allocation pattern of the index value "4". In a case where a change to the allocation pattern of the index value "2" is predicted, the control unit 29B determines that there is a change in the link direction from the uplink to the downlink within the same subframe (subframe numbers "3" and "8") between the allocation pattern immediately before the prediction (index value "1") and the allocation pattern of the prediction result (index value "2").

In a case where a change to the allocation pattern of the index value "4" is predicted, the control unit 29B determines that there is a change in the link direction from the uplink to the downlink within the same subframe (subframe numbers "6" to "8") between the allocation pattern immediately before the prediction (index value "1") and the allocation pattern of the prediction result (index value "4").

The control unit 29B determines that there is a change in the link direction from the uplink to the downlink within the same subframe (subframe numbers "3" and "6" to "8"). In a case where there is a change in the link direction, the control unit 29B sets the gate states of the predetermined TSs (TS 2 to TS 6) within the subframe (subframe numbers "3" and "6" to "8") of the link direction (downlink) corresponding to the periodicity pattern of the link direction (downlink) with the change to the priority state. Note that the gate states of TSs other than the predetermined TSs are set to the normal state. That is, as described above, for example, it becomes possible to apply the operation in the downstream line to the upstream line, and as a result thereof, the gate states of the predetermined TSs (TS 2 to TS 6) are set to the priority state and the gate states of TSs other than the predetermined TSs (TS 0, TS 1, and TS 7 to TS 9) are set to the normal state even at the timing of the subframe numbers "3" and "6" to "8" in the upstream line. Therefore, it becomes possible to suppress output latency of the MFH packets both in the upstream line and in the downstream line in the predetermined TSs at the timing of the subframe numbers "3" and "6" to "8".

Even in a case where a change in the link direction within the same subframe (subframe numbers "3" and "6" to "8") is predicted between the allocation pattern immediately before the prediction and the allocation pattern of the prediction result, the gate state of the predetermined TS in the subframe in which the link direction has changed is set to the priority state. Moreover, the gate states of TSs other than the predetermined TS are set to the normal state. As a result, even in a case where a change to a plurality of index values based on the dynamic TDD scheme in the wireless section 6A is predicted, it becomes possible to suppress output latency of the MFH packets while the index value in which the change is predicted is being reflected.

Besides, even in the case of setting the gate state of the subframe to the priority state, not all gate states of all TSs within the subframe are set to the priority state, but only the gate states of the predetermined TSs corresponding to the periodicity pattern of the MFH packets are set to the priority state. Then, the gate states of TSs other than the predetermined TSs are set to the normal state. As a result, reduction of output opportunities of non-MFH packets due to the priority output of MFH packets is suppressed, whereby it becomes possible to improve the total throughput of packet output.

Figure 17:
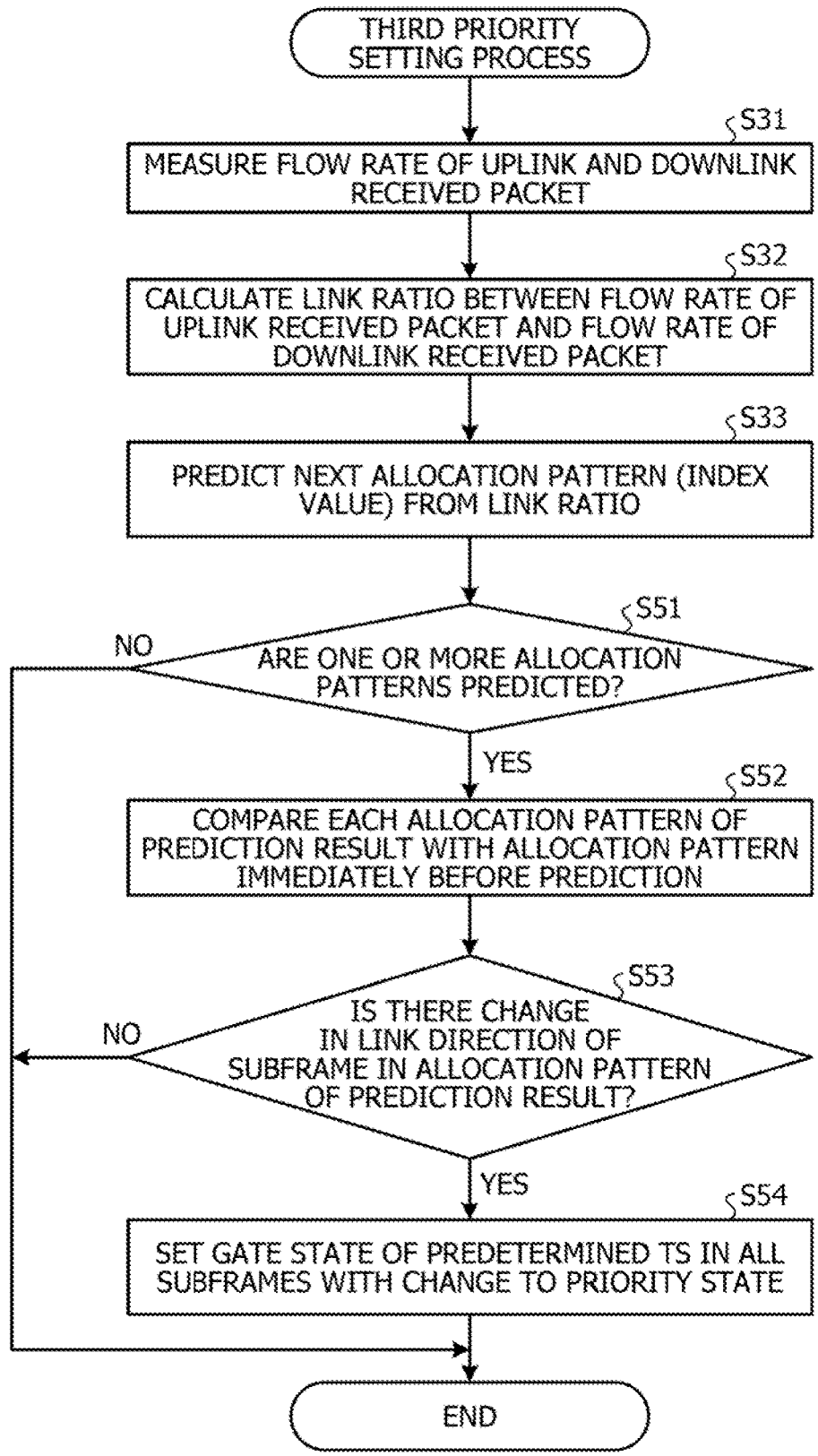
FIG. 17 is a flowchart illustrating exemplary processing operation of the packet processor related to a third priority setting process.
Figure 18A:
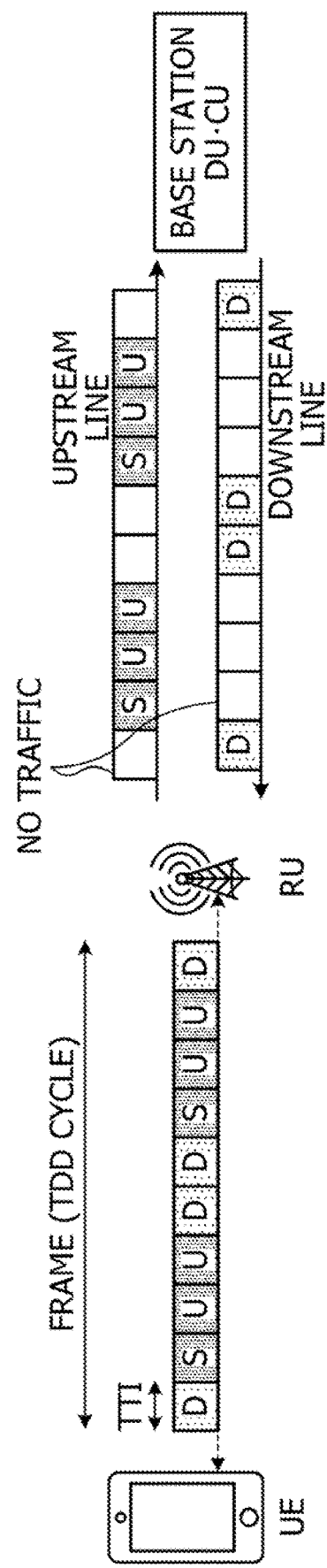
FIG. 18A is an explanatory diagram illustrating an exemplary method of transmitting signals in uplink and downlink subframe units in the wireless section and the wired section.

FIG. 17 is a flowchart illustrating exemplary processing operation of the packet processor 12 related to the third priority setting process. In FIG. 17, after the next allocation pattern is predicted from the link ratio in step S33, the control unit 29B determines whether one or more allocation patterns have been predicted (step S51). In a case where one or more allocation patterns have been predicted (Yes in step S51), the control unit 29B compares each allocation pattern of the prediction result with the allocation pattern immediately before the prediction (step S52).

The control unit 29B determines, for each allocation pattern of the prediction result, whether there is a change in the link direction of the subframe in the allocation pattern immediately before the prediction (step S53). In a case where there is a change in the link direction of the subframe in the allocation pattern immediately before the prediction (Yes in step S53), the control unit 29B sets the gate states of the predetermined TSs in all the subframes with the change to the priority state (step S54), and ends the processing operation illustrated in FIG. 17. Note that the gate states of TSs other than the predetermined TSs are set to the normal state.

In a case where there is no change in the link direction of the subframe in the allocation pattern immediately before the prediction (No in step S53), the control unit 29B ends the processing operation illustrated in FIG. 17. In a case where one or more allocation patterns have not been predicted (No in step S51), the control unit 29B ends the processing operation illustrated in FIG. 17.

In a case where a plurality of allocation patterns has been predicted on the basis of the link ratio, the packet processor 12 compares each of the allocation patterns immediately after the prediction with the allocation pattern immediately before the prediction. The packet processor 12 determines that there is a change in the link direction from the uplink to the downlink within the same subframe (subframe numbers "3" and "8") between the allocation pattern immediately before the prediction (index value "1") and the allocation pattern of the prediction result (index value "2"). The packet processor 12 determines that there is a change in the link direction from the uplink to the downlink within the same subframe (subframe numbers "6" to "8") between the allocation pattern immediately before the prediction (index value "1") and the allocation pattern of the prediction result (index value "4"). The packet processor 12 determines that there is a change in the link direction from the uplink to the downlink within the same subframe (subframe numbers "3" and "6" to "8"). In a case where there is a change in the link direction, the packet processor 12 sets the gate states of the predetermined TSs (TS 2 to TS 6) within the downlink subframe (subframe numbers "3" and "6" to "8") corresponding to the periodicity pattern of the downlink with the change to the priority state. As a result, even in a case where a plurality of changes in the index value based on the dynamic TDD scheme in the wireless section 6A is predicted, it becomes possible to suppress output latency of the MFH packets while a plurality of predicted index values is being reflected.

Besides, even in the case of setting the gate state of the subframe to the priority state, not all gate states of all TSs within the subframe are set to the priority state, but only the gate states of the predetermined TSs corresponding to the periodicity pattern of the MFH packets are set to the priority state. Moreover, the gate states of TSs other than the predetermined TS are set to the normal state. As a result, reduction of output opportunities of non-MFH packets due to the priority output of MFH packets is suppressed, whereby it becomes possible to improve the total throughput of packet output.

Although there are two types of packets including an MFH packet as a high-priority packet and a non-MFH packet as a low-priority packet in the embodiments described above, it is not limited to two types, and may be changed as appropriate. For example, in a case where the priority is set to three types of packets, three gates are disposed and the setting state of each gate in the list table 28 is stored.

Although the time width of the subframe corresponding to the 5G wireless signals is set to 1 ms in the embodiments described above, for example, it is not limited thereto, and may be changed as appropriate.

In the embodiments described above, the prediction unit 25, the allocation pattern table 26, the learning unit 27, the list table 28, and the control unit 29 are disposed in the packet processor 12. However, for example, the prediction unit 25, the allocation pattern table 26, the learning unit 27, the list table 28, and the control unit 29 may be disposed inside the CPU 15, and may be changed as appropriate.

Although one cycle of the subframe is set to N=10 TSs in the embodiments described above, it is sufficient if the periodicity can be maintained, and one cycle of the subframe may be set to a multiple of N, and may be changed as appropriate.

Although the packet processing apparatus 5 in the MFH is exemplified in the embodiments described above, it is not limited to mobile wireless communication, and may be applied to, for example, low-latency processing using the TAS as a packet processing apparatus to be connected to Ethernet (registered trademark) in a factory as a field other than mobile. It is not limited to a terminal device to be connected to a distributed station by wireless communication, and may be connected by wired communication, which may be changed as appropriate.

Furthermore, each of the constituent elements of the units illustrated in the drawings is not necessarily physically configured as illustrated in the drawings. In other words, for example, specific forms of separation and integration of the respective units are not limited to the illustrated forms, and all or some of the units may be functionally or physically separated and integrated in an arbitrary unit according to various loads, use situations, and the like.

Moreover, all or arbitrary some of various processing functions executed in the respective devices may be executed by a central processing unit (CPU) (or a microcomputer such as a micro processing unit (MPU) and a micro controller unit (MCU)). Furthermore, all or some of the various processing functions may of course be executed by a program analyzed and executed by a CPU (or a microcomputer such as an MPU and an MCU) or hardware using wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet processing apparatus that connects, by full-duplex communication using an upstream line and a downstream line, a distributed station and a central station, the packet processing apparatus comprising: a memory configured to store a plurality of allocation patterns for allocating an upstream or downstream of a link direction for each subframe within a predetermined period based on a time division duplex scheme; a processor configured to obtain a periodicity pattern of a high-priority packet for each of time slots within the subframe for each of the link directions; a first gate configured to open and close, for each of the time slots within the subframe, output of the high-priority packet to the upstream line or the downstream line; and a second gate configured to open and close, for each of the time slots within the subframe, output of a low-priority packet to the upstream line or the downstream line, wherein the processor is further configured to set gate states of the first gate and the second gate for a predetermined time slot within the subframe in the same link direction as the periodicity pattern to a priority state in which the high-priority packet is preferentially output according to the periodicity pattern, wherein the processor is further configured to predict a next allocation pattern from the plurality of allocation patterns based on a flow rate of received packets for each of the link directions, and set the gate states of the first gate and the second gate for the predetermined time slot corresponding to the periodicity pattern within the subframe in the link direction in which there is a change in the link direction in the same subframe between an allocation pattern immediately before a prediction and an allocation pattern of a prediction result to the priority state in which the high-priority packet is preferentially output.

2. The packet processing apparatus according to claim 1, wherein the processor is further configured to when a state with a change in the link direction in the same subframe between the allocation pattern of the prediction result and a current allocation pattern has transitioned to a state with no change, switch the gate state for the predetermined time slot within the subframe in which the state with the change has transitioned to the state with no change from the priority state to a normal state in which the high-priority packet and the low-priority packet are selectively output.

3. The packet processing apparatus according to claim 2, wherein the processor is further configured to: as the priority state, set output of the first gate to an open state and output of the second gate toa closed state, and as the normal state, set the output of the first gate to the open state and the output of the second gate to the open state.

4. The packet processing apparatus according to claim 1, wherein the processor is further configured to: when there is a change in the link direction within the same subframe between the allocation pattern immediately before the prediction and the allocation pattern of the prediction result, determine whether the high-priority packet has arrived in a head time slot in predetermined time slots within the subframe with the change in the link direction, and when the high-priority packet has arrived in the head time slot, set the gate states for the predetermined time slots including the head time slot to the priority state.

5. The packet processing apparatus according to claim 4, wherein the processor is further configured to when the high-priority packet has not arrived in the head time slot, set the gate states for the predetermined time slots other than the head time slot to a normal state in which the high-priority packet and the low-priority packet are selectively output.

6. The packet processing apparatus according to claim 1, wherein the processor is further configured to when the processor predicts a plurality of next allocation patterns, compare each allocation pattern of the prediction result with the allocation pattern immediately before the prediction, and in a case where there is a change in the link direction within the same subframe between the allocation pattern immediately before the prediction and the allocation pattern of the prediction result, set the gate state for the predetermined time slot corresponding to the periodicity pattern within the subframe in the link direction with the change to the priority state.

7. A method for packet processing, the method comprising: connecting, by full-duplex communication using an upstream line and a downstream line, a distributed station and a central station, and storing a plurality of allocation patterns for allocating an upstream or downstream of a link direction for each subframe within a predetermined period based on the time division duplex scheme; obtaining a periodicity pattern of a high-priority packet for each of time slots within the subframe for each of the link directions; setting gate states of a first gate and a second gate for a predetermined time slot within the subframe in the same link direction as the periodicity pattern to a priority state in which the high-priority packet is preferentially output according to the periodicity pattern; opening and closing, for each of the time slots within the subframe, output of the high-priority packet to the upstream line or the downstream line using the first gate; opening and closing, for each of the time slots within the subframe, output of a low-priority packet to the upstream line or the downstream line using the second gate; predicting a next allocation pattern from the plurality of allocation patterns based on a flow rate of received packets for each of the link directions; and setting the gate states of the first gate and the second gate for the predetermined time slot corresponding to the periodicity pattern within the subframe in the link direction in which there is a change in the link direction in the same subframe between an allocation pattern immediately before a prediction and an allocation pattern of a prediction result to the priority state in which the high-priority packet is preferentially output.

* * * * *